(12) United States Patent
Brandvold et al.

(10) Patent No.: US 8,324,438 B2
(45) Date of Patent: *Dec. 4, 2012

(54) PRODUCTION OF BLENDED GASOLINE AND BLENDED AVIATION FUEL FROM RENEWABLE FEEDSTOCKS

(75) Inventors: Timothy A. Brandvold, Arlington Heights, IL (US); Michael J. McCall, Geneva, IL (US)

(73) Assignee: UOP LLC, Des Plaines, IL (US)

(*) Notice: Subject to any disclaimer, the term of this patent is extended or adjusted under 35 U.S.C. 154(b) by 477 days.

This patent is subject to a terminal disclaimer.

(21) Appl. No.: 12/418,994

(22) Filed: Apr. 6, 2009

(65) Prior Publication Data

US 2009/0250376 A1 Oct. 8, 2009

Related U.S. Application Data

(60) Provisional application No. 61/042,743, filed on Apr. 6, 2008.

(51) Int. Cl.
*C10L 1/04* (2006.01)
*C07C 1/20* (2006.01)

(52) U.S. Cl. .............. 585/240; 585/14; 208/15; 208/16; 208/17

(58) Field of Classification Search .......... 585/240
See application file for complete search history.

(56) References Cited

U.S. PATENT DOCUMENTS

| | | |
|---|---|---|
| 4,115,246 A | 9/1978 | Sweany |
| 4,795,841 A | 1/1989 | Elliott et al. |
| 4,997,548 A | 3/1991 | Rantell et al. |
| 5,180,868 A | 1/1993 | Baker et al. |
| 5,186,722 A | 2/1993 | Cantrell et al. |
| 5,705,722 A | 1/1998 | Monnier et al. |
| 7,232,935 B2 | 6/2007 | Jakkula et al. |
| 7,279,018 B2 | 10/2007 | Jakkula et al. |
| 7,425,657 B1 | 9/2008 | Elliott et al. |
| 7,459,597 B2 | 12/2008 | Koivusalmi et al. |
| 7,491,858 B2 | 2/2009 | Murzin et al. |
| 7,500,997 B2 | 3/2009 | Norbeck et al. |
| 7,501,546 B2 | 3/2009 | Koivusalmi et al. |
| 7,511,181 B2 * | 3/2009 | Petri et al. ............ 585/240 |
| 7,540,952 B2 | 6/2009 | Pinho et al. |

(Continued)

FOREIGN PATENT DOCUMENTS

CN 11270300 A 9/2008

(Continued)

OTHER PUBLICATIONS

Baker, et al. "Catalytic Upgrading of Biomass Pyrolysis Oils" Pacific Northwest Laboratory, Richland, Washington, USA, pp. 883-895.

(Continued)

*Primary Examiner* — Ellen McAvoy
(74) *Attorney, Agent, or Firm* — Maryann Maas

(57) ABSTRACT

A process for producing at least one blended fuel from a paraffin rich component and a cyclic rich component, where each of the components are generated from a renewable feedstock, is presented. The paraffin rich component is generated from glycerides and free fatty acids in feedstocks such as plant and animal oils. The cyclic rich component is generated from biomass derived pyrolysis oil. The source of the animal or plant oil and the biomass may be the same renewable source.

21 Claims, 4 Drawing Sheets

U.S. PATENT DOCUMENTS

| | | | |
|---|---|---|---|
| 7,578,927 B2 * | 8/2009 | Marker et al. .................. | 208/67 |
| 7,928,273 B2 * | 4/2011 | Bradin ............................ | 585/14 |
| 2006/0186020 A1 | 8/2006 | Gomes | |
| 2006/0207166 A1 | 9/2006 | Herskowitz et al. | |
| 2007/0006523 A1 | 1/2007 | Myllyoja et al. | |
| 2007/0010682 A1 | 1/2007 | Myllyoja et al. | |
| 2007/0068848 A1 | 3/2007 | Monnier et al. | |
| 2007/0131579 A1 | 6/2007 | Koivusalmi et al. | |
| 2007/0135316 A1 | 6/2007 | Koivusalmi et al. | |
| 2007/0135663 A1 | 6/2007 | Aalto et al. | |
| 2007/0161832 A1 | 7/2007 | Myllyoja et al. | |
| 2007/0170091 A1 | 7/2007 | Monnier et al. | |
| 2007/0175795 A1 | 8/2007 | Yao et al. | |
| 2007/0260102 A1 | 11/2007 | Duarte Santiago et al. | |
| 2007/0281875 A1 | 12/2007 | Scheibel et al. | |
| 2007/0287873 A1 | 12/2007 | Coupard et al. | |
| 2007/0299291 A1 | 12/2007 | Koivusalmi | |
| 2008/0025903 A1 | 1/2008 | Cortright | |
| 2008/0033188 A1 | 2/2008 | Dumesic et al. | |
| 2008/0045731 A1 | 2/2008 | Zhang | |
| 2008/0050792 A1 | 2/2008 | Zmierczak et al. | |
| 2008/0052983 A1 | 3/2008 | Aulich et al. | |
| 2008/0066374 A1 | 3/2008 | Herskowitz | |
| 2008/0076945 A1 | 3/2008 | Marker et al. | |
| 2008/0092436 A1 | 4/2008 | Seames et al. | |
| 2008/0132435 A1 | 6/2008 | Ferreira Fontes et al. | |
| 2008/0156694 A1 | 7/2008 | Chapus et al. | |
| 2008/0161614 A1 | 7/2008 | Bertoncini et al. | |
| 2008/0161615 A1 | 7/2008 | Chapus et al. | |
| 2008/0163543 A1 | 7/2008 | Abhari et al. | |
| 2008/0173570 A1 | 7/2008 | Marchand et al. | |
| 2008/0216391 A1 | 9/2008 | Cortright et al. | |
| 2008/0229654 A1 | 9/2008 | Bradin | |
| 2008/0244962 A1 | 10/2008 | Abhari et al. | |
| 2008/0281134 A1 | 11/2008 | Ghonasgi et al. | |
| 2008/0300434 A1 | 12/2008 | Cortright et al. | |
| 2008/0300435 A1 | 12/2008 | Cortright et al. | |
| 2008/0302001 A1 | 12/2008 | Koivusalmi et al. | |
| 2008/0308457 A1 | 12/2008 | Dindi et al. | |
| 2008/0308458 A1 | 12/2008 | Dindi et al. | |
| 2008/0312480 A1 | 12/2008 | Dindi et al. | |
| 2008/0313955 A1 | 12/2008 | Silva et al. | |
| 2009/0000185 A1 * | 1/2009 | Aulich et al. .................. | 44/308 |
| 2009/0014354 A1 | 1/2009 | Knuuttila et al. | |
| 2009/0019763 A1 | 1/2009 | Ghonasgi et al. | |
| 2009/0029427 A1 | 1/2009 | Miller | |
| 2009/0031617 A1 | 2/2009 | O'Rear | |
| 2009/0062578 A1 | 3/2009 | Koivusalmi et al. | |
| 2009/0069610 A1 | 3/2009 | Roberts, IV et al. | |
| 2009/0071872 A1 | 3/2009 | Ginosar et al. | |
| 2009/0077866 A1 | 3/2009 | Kalnes et al. | |
| 2009/0082606 A1 | 3/2009 | Marker et al. | |
| 2009/0084026 A1 | 4/2009 | Miller | |
| 2009/0088351 A1 | 4/2009 | Miller | |
| 2009/0107033 A1 | 4/2009 | Gudde et al. | |
| 2009/0124839 A1 | 5/2009 | Dumesic et al. | |
| 2009/0126260 A1 | 5/2009 | Aravanis et al. | |
| 2009/0158637 A1 * | 6/2009 | McCall et al. .................. | 44/308 |
| 2009/0253947 A1 | 10/2009 | Brandvold et al. | |
| 2009/0253948 A1 | 10/2009 | McCall et al. | |
| 2009/0287029 A1 * | 11/2009 | Anumakonda et al. ......... | 585/16 |
| 2009/0294324 A1 | 12/2009 | Brandvold et al. | |
| 2009/0301930 A1 | 12/2009 | Brandvold et al. | |
| 2010/0287821 A9 * | 11/2010 | Myllyoja et al. ................ | 44/308 |
| 2011/0061290 A1 * | 3/2011 | Aulich et al. .................. | 44/308 |

FOREIGN PATENT DOCUMENTS

| | | |
|---|---|---|
| CN | 11343552 A | 1/2009 |
| EP | 1719811 A1 | 8/2006 |
| EP | 2046917 | 1/2008 |
| WO | 2007063874 A1 | 6/2007 |
| WO | 2007064015 A1 | 6/2007 |
| WO | 2007064019 A1 | 6/2007 |
| WO | 2007125332 A1 | 11/2007 |
| WO | 2007141293 A1 | 12/2007 |
| WO | 2008012415 A2 | 1/2008 |
| WO | 2008020048 A2 | 2/2008 |
| WO | 2008053284 A1 | 5/2008 |
| WO | 2008101945 A1 | 8/2008 |
| WO | 2008105518 A1 | 9/2008 |
| WO | 2008119895 A2 | 9/2008 |
| WO | 2008141830 A1 | 11/2008 |
| WO | 2008141831 A1 | 11/2008 |
| WO | 2008151792 A1 | 12/2008 |
| WO | 2008152199 A1 | 12/2008 |
| WO | 2009004181 A2 | 1/2009 |
| WO | 2009011639 A2 | 1/2009 |
| WO | 2009013233 A2 | 1/2009 |
| WO | 2009020055 A1 | 2/2009 |
| WO | 2009025542 A1 | 2/2009 |
| WO | 2009059819 A1 | 5/2009 |
| WO | 2009059920 A2 | 5/2009 |

OTHER PUBLICATIONS

Elliott, et al. "Hydrotreating Biomass Liquids to Produce . . . ", presented in Washington, D.C., Apr. 7-10, 1986, published by IGT, Chicago: 1987. Chapter 42, pp. 765-784.

Baker, et al. "Technoeconomic Assessment of Direct Biomass Liquefaction to Transportation Fuels", Biomass 22 (1990) pp. 251-269.

Elliott, et al. "Developments in Thermochemical Biomass Conversion." vol. 1, pp. 611-621, Blackie Academic & Professional, London: 1996.

Office Action dated Jun. 21, 2011 for U.S. Appl. No. 12/418,986, Brandvold et al.

Applicant's Sep. 21, 2011 response to the Jun. 21, 2011 Office Action for U.S. Appl. No. 12/418,986, Brandvold et al.

Office Action dated Dec. 12, 2011 for U.S. Appl. No. 12/418,986, Brandvold et al.

Applicant's Mar. 12, 2012 response to the Dec. 12, 2011 Office Action for U.S. Appl. No. 12/418,986, Brandvold et al.

Office Action dated Jun. 16, 2011 for U.S. Appl. No. 12/418,971, Brandvold et al.

Applicant's Sep. 16, 2011 response to the Jun. 16, 2011 Office Action for U.S. Appl. No. 12/418,971, Brandvold et al.

Office Action dated Dec. 1, 2011 for U.S. Appl. No. 12/418,971, Brandvold et al.

Applicant's Feb. 29, 2012 response to the Dec. 1, 2011 Office Action for U.S. Appl. No. 12/418,971, Brandvold et al.

Office Action dated Jun. 16, 2011 for U.S. Appl. No. 12/418,963, Brandvold et al.

Applicant's Sep. 16, 2011 response to the Jun. 16, 2011 Office Action for U.S. Appl. No. 12/418,963, Brandvold et al.

Office Action dated Nov. 30, 2011 for U.S. Appl. No. 12/418,963, Brandvold et al.

Applicant's Feb. 29, 2012 response to the Nov. 30, 2011 Office Action for U.S. Appl. No. 12/418,963, Brandvold et al.

Office Action dated Dec. 27, 2011 for U.S. Appl. No. 12/419,005, McCall et al.

Applicant's Mar. 27, 2012 response to the Dec. 27, 2011 Office Action for U.S. Appl. No. 12/419,005, McCall et al.

Speight, J. G., The Chemistry and Technology of Petroleum, 3rd ed., Marcel-Dekker, p. 918.

U.S. Office Action, U.S. Appl. No. 12/419,005, Notification date:Dec. 27, 2011.

Office Action dated May 22, 2012 for U.S. Appl. No. 12/418,971, Brandvold et al.

Applicant's Sep. 17, 2012 response to the May 22, 2012 Office Action for U.S. Appl. No. 12/418,971, Brandvold et al.

Office Action dated May 21, 2012 for U.S. Appl. No. 12/418,963, Brandvold et al.

Applicant's Sep. 17, 2012 response to the May 21, 2012 Office Action for U.S. Appl. No. 12/418,963, Brandvold et al.

Office Action dated Jun. 4, 2012 for U.S. Appl. No. 12/419,005, McCall et al.

Applicant's Sep. 7, 2012 response to the Jun. 4, 2012 Office Action for U.S. Appl. No. 12/419,005, McCall et al.

Office Action dated Mar. 27, 2012 for U.S. Appl No. 12/418,986, Brandvold et al.

* cited by examiner

PRODUCTION OF BLENDED GASOLINE AND BLENDED AVIATION FUEL FROM RENEWABLE FEEDSTOCKS

CROSS-REFERENCE TO RELATED APPLICATION

This application claims priority from Provisional Application Ser. No. 61/042,743 filed Apr. 6, 2008, the contents of which are hereby incorporated by reference in its entirety.

STATEMENT REGARDING FEDERALLY SPONSORED RESEARCH OR DEVELOPMENT

This invention was made under the support of the United States Government, United States Army Research Office, with financial support from DARPA, Agreement Number W911NF-07-C-0049. The United States Government has certain rights in the invention.

BACKGROUND OF THE INVENTION

The process produces one or more blended fuels from renewable feedstocks including biomass derived pyrolysis oil and the triglycerides and free fatty acids found in plant and animal oils fats and greases. At least one paraffin rich component is produced from the triglycerides and free fatty acids found in plant and animal oils fats and greases while at least one cyclic rich component is produced from a biomass derived pyrolysis oil. At least one paraffin rich fuel component and at least one cyclic rich fuel component are blended to form at least one fuel.

The generation of the paraffin rich component employs a process for producing hydrocarbons from renewable feedstocks such as the triglycerides and free fatty acids found in materials such as plant oils, fish oils, animal fats, and greases. The process involves hydrogenation, decarboxylation, decarbonylation, and/or hydrodeoxygenation, hydroisomerization, and selective cracking in two or more steps. The selective cracking step optimally provides one cracking event per molecule. A reforming step may be optionally employed to generate hydrogen used in the hydrogenation, deoxygenation, hydroisomerization, and selective hydrocracking steps.

As the demand for fuel such as aviation fuel increases worldwide there is increasing interest in sources other than petroleum crude oil for producing the fuel. One such source is what has been termed renewable fats and oils. These renewable sources include, but are not limited to, plant oils such as jatropha, camelina, crambe, corn, rapeseed, canola, soybean and algal oils, animal fats such as tallow, fish oils and various waste streams such as yellow and brown greases and sewage sludge. The common feature of these sources is that they are composed of triglycerides and Free Fatty Acids (FFA). Both of these compounds contain n-paraffin chains generally having from about 8 to about 24 carbon atoms. The n-paraffin chains in the glycerides or FFAs can also be mono, di or poly-unsaturated. Some of the glycerides from the renewable sources may be monoglycerides or diglycerides instead of or in addition to the triglycerides. Fatty acid alkyl esters may be the feedstock or present in the feedstock. Examples include fatty acid methyl ester and fatty acid ethyl ester.

There are reports disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

The paraffin rich blending component is generated by a process which comprises two or more steps to hydrogenate, deoxygenate, isomerize and selectively crack a renewable feedstock, in order to generate a gasoline range product and an aviation range product. Simply deoxygenating the renewable feedstock typically results in strait chain paraffins having chain-lengths similar to, or slightly shorter than, the fatty acid composition of the feedstock. With many feedstocks, this approach results in a fuel meeting the general parameters and characteristics for a diesel fuel, but not those for an aviation fuel. The selective cracking step reduces the chain length of some paraffins to maximize the selectivity to aviation fuel range paraffins while minimizing light products. The selective cracking may occur before, after, or concurrent with the isomerization. An optional reforming step may be included to generate the hydrogen needed in the deoxygenation and the isomerization steps. In one embodiment, a recycle from the effluent of the deoxygenation reaction zone back to the deoxygenation zone is employed. The volume ratio of recycle hydrocarbon to feedstock ranges from about 2:1 to about 8:1 and provides a mechanism to limit reaction zone temperature rise, increase the hydrogen solubility, and more uniformly distribute the heat of reaction in the deoxygenation reaction mixture. As a result of the recycle, some embodiments may have a lower operating pressure.

The generation of the cyclic rich component employs a process for obtaining cyclic rich component from biomass. More particularly, this process relates to the treatment of cellulosic waste, or pyrolysis oil, produced from the pyrolysis of biomass to produce fuel or fuel blending or additive components. The fuel, fuel additives, or blending components may include those in the gasoline boiling point range, the diesel boiling point range, and the aviation boiling point range.

As discussed above, renewable energy sources are of increasing importance. They are a means of reducing dependence on petroleum oil and provide a substitute for fossil fuels. Also, renewable resources can provide for basic chemical constituents to be used in other industries, such as chemical monomers for the making of plastics. Biomass is a renewable resource that can provide some of the needs for sources of chemicals and fuels.

Biomass includes, but is not limited to, lignin, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. Lignocellulosic biomass, or cellulosic biomass as used throughout the remainder of this document, consists of the three principle biopolymers cellulose, hemicellulose, and lignin. The ratio of these three components varies depending on the biomass source. Cellulosic biomass might also contain lipids, ash, and protein in varying amounts. The economics for converting biomass to fuels or chemicals depend on the ability to produce large amounts of biomass on marginal land, or in a water environment where there are few or no other significantly competing economic uses of that land or water environment. The economics can also depend on the disposal of biomass that would normally be placed in a landfill.

The growing, harvesting and processing of biomass in a water environment provides a space where there is plenty of sunlight and nutrients while not detracting from more productive alternate uses. Biomass is also generated in many everyday processes as a waste product, such as waste material from crops. In addition, biomass contributes to the removal of carbon dioxide from the atmosphere as the biomass grows. The use of biomass can be one process for recycling atmospheric carbon while producing fuels and chemical precursors. Biomass when heated at short contact times in an environment with low or no oxygen, termed pyrolysis, will generate a liquid product known as pyrolysis oil. Synonyms for pyrolysis oil include bio-oil, pyrolysis liquids, bio-crude oil, wood liquids, wood oil, liquid smoke, wood distillates, pyroligneous acid, and liquid wood.

The product of the biomass pyrolysis, the pyrolysis oil, contains what is known as pyrolytic lignin. Pyrolytic lignin is the water insoluble portion of the pyrolysis oil. The pyrolysis oil may be processed whole, or a portion of the aqueous phase may be removed to provide a pyrolysis oil enriched in pyrolytic lignin which is processed through deoxygenation to produce the cyclic rich fuel blending component.

At least one paraffin rich component and at least one cyclic rich component are blended to form a fuel. The blending is controlled so that the blended fuel meets specific requirements of a target fuel. Other additives or components may be blended with the paraffin rich component and the cyclic rich component in order to meet additional requirements of the target fuel. The target fuel may be in the boiling point ranges of gasoline, aviation, and diesel, and may be entirely derived from renewable sources. The target fuel is designed to power engines or devices that are currently distributed around the world without requiring upgrades to those engines. The target fuel may be blended to meet the specifications using entirely renewable feedstock derived blending components.

SUMMARY OF THE INVENTION

A process for producing a blended fuel where at least one paraffin rich component and at least one cyclic rich component are blended to form a target fuel, and wherein the paraffin rich component and the cyclic rich component are each produced from a renewable feedstock. The paraffin rich component is produced from the triglycerides and free fatty acids found in plant and animal oils, fats, and greases, and the cyclic rich component is produced from a biomass derived pyrolysis oil.

The portion of the process which provides the paraffin rich component comprises treating a renewable feedstock in a reaction zone by hydrogenating and deoxygenating the feedstock at reaction conditions to provide a reaction product comprising n-paraffins, isomerizing the n-paraffins to improve cold-flow properties, and selectively cracking the paraffins to provide paraffins useful as fuel or a fuel blending component. The selective cracking may occur before, after, or concurrent with the isomerization. The selective cracking is a process step that preferentially cracks C1-C6 fragments off the end of the long chain n-paraffins to increase the selectivity to the desired carbon number range paraffins significantly in excess of a non-selective statistical cracking process. In one embodiment, a portion of the n-paraffins generated in the deoxygenation step is recycled to the reaction zone with a volume ratio of recycle to feedstock in the range of about 2:1 to about 8:1 in order to increase the solubility of hydrogen in deoxygenation reaction mixture. An optional reforming step may be included in order to produce hydrogen needed in the hydrogenation, deoxygenation, hydroisomerization, and selective hydrocracking steps.

The portion of the process which provides the cyclic rich component has biomass derived pyrolysis oil as the renewable feedstock. The pyrolysis oil was derived from the pyrolysis of biomass. The pyrolysis oil may optionally be enriched in pyrolytic lignin through the removal of at least a portion of the aqueous phase, but the process also allows the whole pyrolytic lignin of the pyrolysis oil to be processed without removal of a portion of the aqueous phase. The whole pyrolysis oil or the pyrolytic lignin enriched pyrolysis oil, is treated in a first deoxygenation zone generating a partially deoxygenated stream. Water, gasses, and light ends are removed and the remainder of the partially deoxygenated stream is further treated in a second deoxygenation zone to produce a deoxygenated product stream. The deoxygenated product stream comprises cyclic hydrocarbon compounds that when fractionated are useful as the cyclic rich component(s) in the gasoline and naphtha, aviation, and diesel boiling point ranges.

After the second deoxygenation zone, water light ends, and gasses may be removed from the effluent of the second deoxygenation zone. Hydrogen may be separated and recycled. In one embodiment the first and second deoxygenation zones are combined and housed within in a single reactor.

At least one paraffin rich component and at least one cyclic rich component are blended to form at least one fuel.

BRIEF DESCRIPTION OF THE DRAWINGS

FIG. 4 shows the option where the whole pyrolysis oil is processed through two stages of deoxygenation.

DETAILED DESCRIPTION OF THE INVENTION

Figure 1:
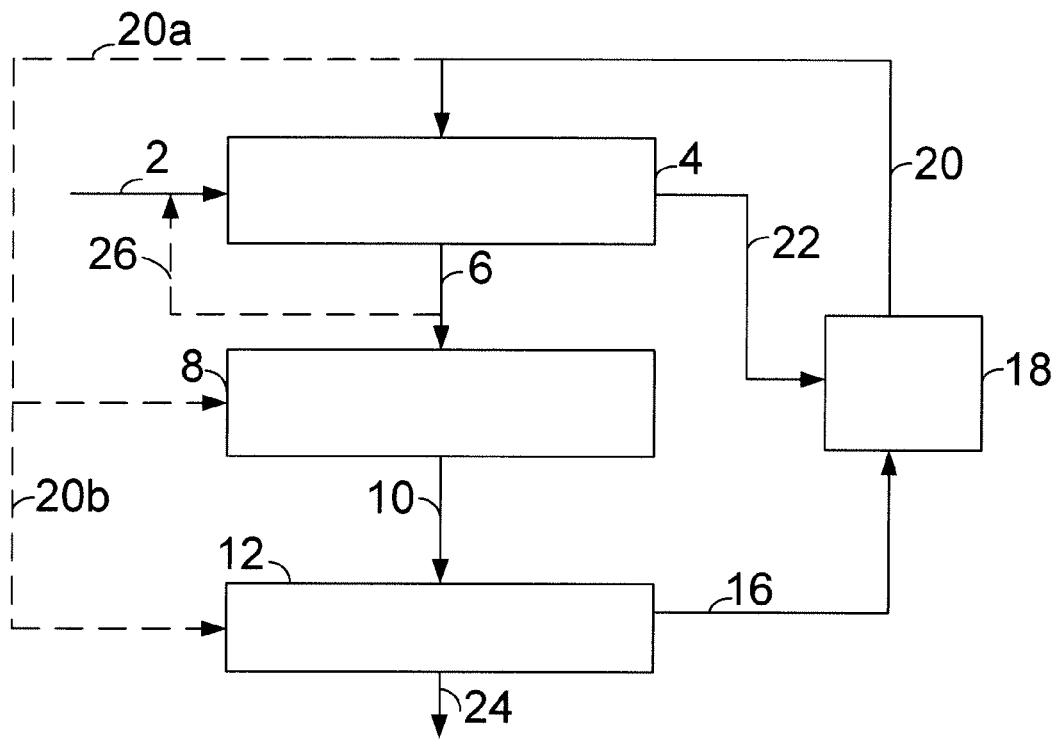
FIG. 1 is a general flow scheme diagram of the invention where isomerization occurs before selective cracking.

The invention provides a process for generating at least one paraffin rich component from a renewable feedstock and at least one cyclic rich component from a renewable feedstock, and blending at least those two components to provide a blended fuel.

Generating the Paraffin Rich Component

The paraffin rich component may be one or more hydrocarbon streams, an aviation boiling point range product, and a gasoline and naphtha boiling point range product, or the combination thereof from renewable feedstocks such as feedstocks originating from plants or animals. The term "rich" is meant to indicate at least 40 mass-%. The term renewable feedstock is meant to include feedstocks other than those obtained directly from petroleum crude oil. Another term that has been used to describe this class of feedstocks is renewable fats and oils. The renewable feedstocks that can be used in the present invention include any of those which comprise triglycerides and free fatty acids (FFA). Fatty acid alkyl esters may be a feedstock or may be a portion of a feedstock.

Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, crambe oil, curcas oil, babassu oil, palm kernel oil, and the like. The glycerides and FFAs and free fatty alkyl esters of the typical vegetable or animal fat contain aliphatic hydrocarbon chains in their structure which have about 8 to about 24 carbon atoms with a majority of the oils containing high concentrations of fatty acids with 16 and 18 carbon atoms. Mixtures or co-feeds of renewable feedstocks and fossil fuel derived, such as petroleum derived, hydrocarbons may also be used as the feedstock. Other non-oxygenated feedstock components which may be used, especially as a co-feed component in combination with the above listed feedstocks, include liquids derived from gasification of coal or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is transformation of what has been considered to be a waste product from a petroleum based process or other processes into a valuable co-feed component to the current process.

The composition generated in this portion of the process is suitable for, or as a blending component for, an aviation fuel or a gasoline fuel. Depending upon the application, various additives may be combined with the fuel composition generated in order to meet required specifications for different specific fuels. For example, the aviation boiling point range composition generated herein complies with, is a blending component for, or may be combined with one or more additives to meet at least one of: ASTM D 1655 Specification for Aviation Turbine Fuels Defense Stan 91—91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MIL-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8 which is a military grade type of highly refined kerosene based jet propellant specified by the United States Government. The fuel is defined by Military Specification MIL-DTL-83133. The jet fuel product is very similar to iso-paraffinic kerosene or iPK, also known as synthetic paraffinic kerosene and as synthetic jet fuel.

Renewable feedstocks that can be used in this portion of the process may contain a variety of impurities. For example, tall oil is a by product of the wood processing industry and tall oil contains esters and rosin acids in addition to FFAs. Rosin acids are cyclic carboxylic acids. The bio-renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. Another technique involves contacting the renewable feedstock with a bleaching earth, such as bentonite clay, in a pretreatment zone.

Another possible means for removing contaminants is a mild acid wash. This is carried out by contacting the renewable feedstock with an acid such as sulfuric, nitric or hydrochloric and water in a reactor. The acidic aqueous solution and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. application Ser. No. 11/770,826 is another pretreatment technique which may be employed.

The renewable feedstock is flowed to a reaction zone comprising one or more catalyst beds in one or more reactors. The term "feedstock" is meant to include feedstocks that have not been treated to remove contaminants as well as those feedstocks purified to remove contaminants. In the reaction zone, the feedstock is contacted with a hydrogenation or hydrotreating catalyst in the presence of hydrogen at hydrogenation conditions to hydrogenate the olefinic or unsaturated portions of the fatty acid chains. Hydrogenation or hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 200° C. to about 300° C. or to about 450° C. and a pressure of about 1379 kPa absolute (200 psia) to about 10,342 kPa absolute (1500 psia), or to about 4826 kPa absolute (700 psia). Other operating conditions for the hydrogenation zone are well known in the art.

The hydrogenation and hydrotreating catalysts enumerated above are also capable of catalyzing decarboxylation, decarbonylation, and/or hydrodeoxygenation of the feedstock to remove oxygen. Decarboxylation, decarbonylation, and hydrodeoxygenation are herein collectively referred to as deoxygenation reactions. Decarboxylation and decarbonylation conditions pressures including a relatively low pressure of about 1724 kPa absolute (250 psia) to about 10,342 kPa absolute (1500 psia), with embodiments in the range of 3447 kPa (500 psia) to about 6895 kPa (1000 psia) or below 700 psia; a temperature of about 200-460 with embodiments in the range of about 288° C. to about 345° C.; and a liquid hourly space velocity of about 0.25 to about 4 $hr^{-1}$ with embodiments in the range of about 1 to about 4 $hr^{-1}$. Since hydrogenation is an exothermic reaction, as the feedstock flows through the catalyst bed the temperature increases and decarboxylation, decarbonylation, and hydrodeoxygenation will begin to occur. Although the hydrogenation reaction is exothermic, some feedstocks may be highly saturated and not generate enough heat internally. Therefore, some embodiments may require external heat input. Thus, it is envisioned and is within the scope of this invention that all the reactions occur simultaneously in one reactor or in one bed. Alternatively, the conditions can be controlled such that hydrogenation primarily occurs in one bed and decarboxylation, decarbonylation, and/or hydrodeoxygenation occurs in a second or additional bed(s). If only one bed is used, it may be operated so that hydrogenation occurs primarily at the front of the bed, while decarboxylation, decarbonylation and hydrodeoxygenation occurs mainly in the middle and bottom of the bed. Finally, desired hydrogenation can be carried out in one reactor, while decarboxylation, decarbonylation, and/or hydrodeoxygenation can be carried out in a separate reactor. However, the order of the reactions is not critical to the success of the process.

Hydrogen is a reactant in the reactions above, and to be effective, a sufficient quantity of hydrogen must be in solution to most effectively take part in the catalytic reaction. If hydrogen is not available at the reaction site of the catalyst, the coke forms on the catalyst and deactivates the catalyst. To solve this kind of problem, the pressure in a reaction zone is often raised to insure enough hydrogen is available to avoid coking reactions on the catalyst. However, higher pressure operations are more costly to build and to operate as compared to their lower pressure counterparts. An advantage of one embodiment of the present invention is that the operating pressure is in the range of about 1379 kPa absolute (200 psia) to about 4826 kPa absolute (700 psia) which is lower than traditionally used in a deoxygenation zone. In another embodiment, the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, with the increase hydrogen in solution, the rate of reaction is increased resulting in a greater amount of throughput of material through the reactor in a given period of time. The lower operating pressures of this embodiment provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint.

In one embodiment of the invention the desired amount of hydrogen is kept in solution at lower pressures by employing a large recycle of hydrocarbon. Other exothermic processes have employed hydrocarbon recycle in order to control the temperature in the reaction zones. However, the range of recycle to feedstock ratios that may be used herein is set based on the need to control the level of hydrogen in the liquid phase and therefore reduce the deactivation rate. The amount of recycle is determined not on temperature control requirements, but instead, based upon hydrogen solubility requirements. Hydrogen has a to greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. In one embodiment of the invention, the volume ratio of hydrocarbon recycle to feedstock is from about 2:1 to about 8:1. In another embodiment the ratio is in the range of about 3:1 to about 6:1 and in yet another embodiment the ratio is in the range of about 4:1 to about 5:1. The ranges of suitable volume ratios of hydrocarbon recycle to feedstock are described in pending application U.S. application Ser. No. 12/193,149. Suitable ranges for hydrogen solubility were shown to begin at about a recycle to feed ratio of about 2:1. From recycle to feed ratios of about 2:1 through 6:1 the simulation of U.S. application Ser. No. 12/193,149 showed that the hydrogen solubility remained high. Thus, the specific ranges of vol/vol ratios of recycle to feed for this embodiment is determined based on achieving a suitable hydrogen solubility in the deoxygenation reaction zone.

In another embodiment, instead of recycling hydrocarbon, one or more of the co-feed components discussed above may be used to provide the solubility of hydrogen and temperature control. Depending upon the relative costs of the hydrocarbon and the co-feed component, one embodiment may be more economic than the other. It is important to note that the recycle or co-feed is optional and the process does not require recycle or co-feed. Complete deoxygenation and hydrogenation may be achieved without recycle or co-feed components. In still another embodiment, the process may be conducted with continuous catalyst regeneration in order to counteract the catalyst deactivation effects of the lower amounts of hydrogen in solution or the higher operating conditions.

The reaction product from the deoxygenation reactions in the deoxygenation zone will comprise a liquid portion and a gaseous portion. The liquid portion comprises a hydrocarbon fraction comprising n-paraffins and having a large concentration of paraffins in the 15 to 18 carbon number range. Different feedstocks will have different distributions of paraffins. A portion of this hydrocarbon fraction, after separation from the gaseous portion, may be used as the hydrocarbon recycle described above. Although this hydrocarbon fraction is useful as a diesel fuel or diesel fuel blending component, additional fuels, such as aviation fuels or aviation fuel blending components, which typically have a concentration of paraffins in the range of about 9 to about 15 carbon atoms, may be produced with additional to processing. Similarly, gasoline or gasoline boiling point range blending components may be produced. Also, because the hydrocarbon fraction comprises essentially all n-paraffins, it will have poor cold flow properties. Aviation fuel and blending components must have better cold flow properties and so the reaction product is further reacted under isomerization conditions to isomerize at least a portion of the n-paraffins to branched paraffins.

Catalysts and conditions for isomerization are well known in the art. See for example US 2004/0230085 A1 which is incorporated by reference in its entirety. The same catalyst may be employed for both the isomerization and the selective cracking, or two or more different catalysts may be employed. Isomerization can be carried out in a separate bed of the same reaction zone, i.e. same reactor, described above or the isomerization can be carried out in a separate reactor. Therefore, the product of the deoxygenation reaction zone is contacted with an isomerization catalyst in the presence of hydrogen at isomerization conditions to isomerize at least a portion of the normal paraffins to branched paraffins. The isomerization catalyst may be the same catalyst as the selective cracking catalyst, or it may be a different catalyst. Due to the presence of hydrogen, this reaction may also be called hydroisomerization. Only minimal branching is required, enough to overcome cold-flow problems of the normal paraffins.

Overall, the isomerization of the paraffinic product can be accomplished in any manner known in the art or by using any suitable catalyst known in the art. Many of the isomerization catalysts are also suitable selective cracking catalysts, although some may require different conditions than would be employed for isomerization alone. Catalysts having small or medium sized pores, which are therefore shape selective, are favorable for catalyzing both the isomerization reaction and the selective cracking. In general, suitable isomerization catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include aluminas, silica-aluminas, ferrierite, ALPO-31, SAPO-11, SAPO-31, SAPO-37, SAPO-41, SM-3, MgAPSO-31, SAPO-41, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR—B) and boro-alumino-silicate (Al—BOR—B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

Isomerization zone conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia).

The product of the hydrogenation, deoxygenation, and isomerization steps contains paraffinic hydrocarbons suitable for use as diesel fuel or as a blending component for diesel fuel, but further processing results in paraffinic hydrocarbons meeting the specifications for other fuels or as blending components for other fuels. As illustrative of this concept, a concentration of paraffins formed from renewable feedstocks typically have about 15 to 18 carbon atoms, but additional paraffins may be formed to provide a range of from about 8 to about 24 carbon atoms. A portion of the normal paraffins are isomerized to branched paraffins, but the carbon number range of paraffins does not alter with only isomerization. The about 9 to about 24 carbon number range is a desired paraffin carbon number range for diesel fuel, which is a valuable fuel itself. Aviation fuel, however, generally comprises paraffins having boiling points from 150° C. to about 300° C. which is lower than that of diesel fuel. To convert the diesel range fuel to a fuel useful for aviation, the larger chain-length paraffins are cracked. Typical cracking processes are likely to crack the paraffins too much and generate a large quantity of undesired low molecular weight molecules which have much lower economic value. In the present invention, the paraffins generated from the renewable feedstock are selectively cracked in order to control the degree of cracking and maximize the amount of product formed in the desired carbon number range. The selective cracking is controlled through catalyst choice and reaction conditions in an attempt to restrict the degree of cracking occurring. Ideally, each paraffin molecule would experience only a single cracking event and ideally that single cracking event would result in at least one paraffin in the C9 to C15 carbon number range.

However, fuel specifications are typically not based upon carbon number ranges. Instead, the specifications for different types of fuels are often expressed through acceptable ranges of chemical and physical requirements of the fuel. For example, aviation turbine fuels, a kerosine type fuel including JP-8, are specified by MIL-DTL-83133, JP-4, a blend of gasoline, kerosene and light distillates, is specified by MIL-DTL-5624 and JP-5 a kerosene type fuel with low volatility and high flash point is also specified by MIL-DTL-5624, with the written specification of each being periodically revised. Often a distillation range from 10 percent recovered to a final boiling point is used as a key parameter defining different types of fuels. The distillations ranges are typically measured by ASTM Test Method D 86 or D2887. Therefore, blending of different components in order to meet the specification is quite common. While the product of this portion of the process, the paraffin rich component, may meet fuel specifications, it is blended with the cyclic rich component in order to meet the desired set of fuel specifications. In other words, the paraffin rich component is a composition which is blended with the cyclic rich component to form a fuel meeting at least one of the specifications for aviation fuel such as JP-8 or for gasoline.

The selective cracking step and the isomerization step may be either co-current or sequential. The cracking may be conducted first to minimize the over-cracking of the highly branched hydrocarbons resulting from the isomerization. The selective cracking may proceed through several different routes. The catalysts for the selective cracking process typically comprise at least a cracking component and a non cracking component. Compositing the catalyst with active and non active cracking components may positively affect the particle strength, cost, porosity, and performance. The non cracking components are usually referred to as the support. However, some traditional support materials such as silica-alumina may make some contribution to the cracking capability of the catalyst. One example of a suitable catalyst is a composite of zeolite beta and alumina or silica alumina. Other inorganic refractory materials which may be used as a support in addition to silica-alumina and alumina include for example silica, zirconia, titania, boria, and zirconia-alumina. These support materials may be used alone or in any combination. Another example is a catalyst based on zeolite Y, or one having primarily amorphous cracking components.

The catalyst of the subject process can be formulated using industry standard techniques. It is may be manufactured in the form of a cylindrical extrudate having a diameter of from about 0.8 to about 3.2 mm (1/32 in to about 1/8 in). The catalyst can be made in any other desired form such as a sphere or pellet. The extrudate may be in forms other than a cylinder such as the form of a well-known trilobe or other shape which has advantages in terms or reduced diffusional distance or pressure drop.

A non-selective catalyst may be utilized under conditions optimized to result in selective cracking, where primary cracking is accomplished with minimal secondary cracking. Furthermore, a non-selective catalyst may be modified to weaken the acidity of the catalyst in order to minimize undesired cracking.

One class of suitable selective cracking catalysts are the shape-selective catalysts. Highly isomerized paraffins are more readily cracked as compared to straight chain or mono-substituted paraffins since they can crack through stabilized carbenium-ion intermediates. Unfortunately, this leads to the tendency for these molecules to over crack and form lighter molecules outside the preferred aviation fuel range. Highly isomerized paraffins are also more likely to crack than the other paraffins and can be prevented from entering the pore structures of some molecular sieves. A shape-selective catalyst would prevent the majority of highly isomerized molecules from entering the pore structure and cracking leaving only straight-chain or slightly isomerized paraffins to crack in the catalyst pores. Furthermore, by selective small to medium size pore molecular sieves, the smaller pore size will prevent easy diffusion of the long chain paraffin deep into the pore system. The end of a long chain paraffin enters the pore channel of the catalyst and encounters a dehydrogenation active site, such as platinum, resulting in an olefin. Protonation of the olefins yields a carbenium ion which rearranges by methyl shift to form a carbenium ion with a single methyl branch, then via β-elimination, the hydrocarbon cracks at the site of the methyl branch yielding two olefins, one short chain and one long chain. In this way, beta scission cracking, the primary mechanism for bronsted acids, will therefore occur close to the pore mouth of the catalyst. Since diffusion is limited, cracking will be primarily at the ends of the paraffins.

Examples of suitable catalysts for this route include ZSM-5, ZSM-23, ZSM-11, ZSM-22 and ferrierite. Further suitable catalysts are described in Arroyo, J. A. M.; Martens, G. G.; Froment, G. F.; Marin, G. B.; Jacobs, P. A.; martens, J. A., Applied Catalysis, A: General, 2000, 192(1) 9-22; Souverijins, W.; martins, J. A.; Froment, G. F.; Jacobs, P. A., Journal of Catalysis, 1998, 174(2) 177-184; Huang, W.; Li, D.; Kang, X; Shi, Y.; Nie, H. Studies in Surface Science and Catalysis, 2004, 154(c), 2353-2358; Claude, M. C.; Martens J. A. Journal of Catalysis, 2000, 190(1), 39-48; Sastre, G.; Chica, A.; Corma, A., Journal of Catalysis, 2000, 195(2), 227-236.

In one embodiment, the selective cracking catalyst also contains a metallic hydrogenolysis component. The hydrogenolysis component is provided as one or more base metals uniformly distributed in the catalyst particle. Noble metals such as platinum and palladium could be applied, or the composition of the metal hydrogenolysis component may be, for example, nickel, iridium, rhenium, rhodium, or mixtures thereof. The hydrogenolysis function preferentially cleaves C1 to C6 fragments from the end of the paraffin molecule. Two classes of catalysts are suitable for this approach. A first class is a catalyst having a hydrogenolysis metal with a mechanistic preference to crack the ends of the paraffin molecules. See, for example, Carter, J. L.; Cusumano, J. A.; Sinfelt, J. H. Journal of Catalysis, 20, 223-229 (1971) and Huang, Y. J.; Fung, S. C.; Gates, W. E.; McVicker, G. B. journal of Catalysis 118, 192-202 (1989). The second class of catalysts include those where the hydrogenolysis function is located in the pore moth of a small to medium pore molecular sieve that prevent facile diffusion of the ling chain paraffin molecule into the pores system. Also, since olefins are easy to protonate, and therefore crack, as compared to paraffins, the dehydrogenation function component may be minimized on the external surface of the catalyst to maintain the selectivity of the cracking. Examples of suitable catalysts for this hydrogenolysis route of selective cracking include silicalite, ferrierite, ZSM-22, ZSM-23 and small to medium pore molecular sieves.

Another suitable type of catalysts include molecular sieves with strong pore acidity, which when used a higher operating temperatures promote Haag Dessau cracking; a type of acid-catalyst cracking that does not require isomerization or a bifunctional catalyst as described in Weitkamp et al. Agnew. Chem. Int. ed. 2001, 40, No. 7, 1244. The intermediate is a carbonium ion formed after prontonation of a carbon-carbon or carbon-hydrogen bond. The catalyst does not need a significant dehydrogenation function since the olefin is not necessary. Residence time on these strong acid sites would need to be minimized to prevent extensive cracking by techniques such as reducing the acid site density or operating at a higher space velocity. An example of a suitable catalyst for this approach is ZSM-5.

The selective cracking is operated at a range of conditions that provide product in the targeted carbon number range. Therefore, the operating conditions in many instances are refinery or processing unit specific. They may be dictated in large part by the construction and limitations of the existing selective cracking unit, which normally cannot be changed without significant expense, the composition of the feed and the desired products. The inlet temperature of the catalyst bed should be in the range of from about 232° C. to about 454° C. (about 450° F. to about 850° F.), and the inlet pressure should be above about 1379 kPa gauge to about 13,790 kPa gauge (200 to about 2,000 psig). The feed stream is admixed with sufficient hydrogen to provide hydrogen circulation rate of about 168 to 1684 n.l/l (1000 to 10000 SCF/barrel, hereafter SCFB) and passed into one or more reactors containing fixed beds of the catalyst. The hydrogen will be primarily derived from a recycle gas stream which may pass through purification facilities for the removal of acid gases. The hydrogen rich gas admixed with the feed and in one embodiment any recycle hydrocarbons will contain at least 90 mol percent hydrogen. The feed rate in terms of liquid hourly space velocity (L.H.S.V.) will normally be within the broad range of about 0.3 to about 5 hr$^{-1}$, with a L.H.S.V. below 1.2 being used in one embodiment.

The two reactions types, isomerization and selective cracking may be carried out together using the same catalyst, or separately using the same or different catalysts. In the situation where the isomerization and selective cracking catalysts are the same, the acidity of the catalyst is selected to be great enough to perform both the isomerization and the selective cracking. In this embodiment, both isomerization and selective cracking occur concurrently. Examples of catalysts suitable for both reaction types include, but are not limited to, zeolite Y, amorphous silica alumina, MOR, SAPO-11 and SM3. An example of combined isomerization and selective cracking conditions include a temperature of about 150° C. to about 360° C. and a pressure of about 1724 kPa absolute (250 psia) to about 4726 kPa absolute (700 psia). In another embodiment the combined isomerization and selective cracking conditions include a temperature of about 300° C. to about 360° C. and a pressure of about 3102 kPa absolute (450 psia) to about 3792 kPa absolute (550 psia).

On the other hand, when the isomerization and selective cracking are conducted in separate reaction zones, the catalysts for the two reaction types need not be the same. Any of the above catalysts may be employed. The selective cracking may be done before or after the isomerization step. Specific examples of isomerization catalysts include those having moderate acidity, enough for isomerization but weak enough to prevent significant cracking, include platinum modified MAPSO-31, platinum modified MAPSO-SM3, platinum modified SAPO-11, and platinum modified and acid washed UZM-15. The prevention of significant cracking is important since the desired product range is C9 to C15 and significant uncontrolled cracking may result in a large amount of C8 and lower carbon atoms paraffins being produced. The selective cracking catalyst may have a higher acidity than the isomerization catalyst, and specific examples include ZSM-5, Y zeolite, and MOR.

Optionally this portion of the process may employ a steam reforming zone in order to provide hydrogen to the hydrogenation/deoxygenation zone, isomerization zone, and/or selective cracking zone. The steam reforming process is a well known chemical process for producing hydrogen, and is the most common method of producing hydrogen or hydrogen and carbon oxide mixtures. A hydrocarbon and steam mixture is catalytically reacted at high temperature to form hydrogen, and the carbon oxides: carbon monoxide and carbon dioxide. Since the reforming reaction is strongly endothermic, heat must be supplied to the reactant mixture, such as by heating the tubes in a furnace or reformer. A specific type of steam reforming is autothermal reforming, also called catalytic partial oxidation. This process differs from catalytic steam reforming in that the heat is supplied by the partial internal combustion of the feedstock with oxygen or air, and not supplied from an external source. In general, the amount of reforming achieved depends on the temperature of the gas leaving the catalyst; exit temperatures in the range of about 700° C. to about 950° C. are typical for conventional hydrocarbon reforming. Pressures may range up to about 4000 kPa absolute. Steam reforming catalysts are well known and conventional catalysts are suitable for use in the present invention.

Typically, natural gas is the most predominate feedstock to a steam reforming process. However, in the present invention, hydrocarbons that are too light for the desired product may be generated at any of the reaction zones. For example, in the deoxygenation zone, propane is a common by product. Other $C_1$ to $C_3$ paraffins may be present as well. These lighter components may be separated from the desired portion of the deoxygenation effluent and routed to the steam reforming zone for the generation of hydrogen. Similarly, paraffins having eight or less carbon atoms from the effluent of the collective isomerization and selective cracking steps may be conducted to the reforming zone. Therefore, the lighter materials from the deoxygenation, isomerization and cracking zones are directed, along with stream, to a reforming zone. In the reforming zone, the lighter hydrocarbons and steam are catalytically reacted to form hydrogen and carbon oxides. The steam reforming product may be recycled to any of the reaction zones to provide at least hydrogen to the reaction zone. Optionally, the hydrogen may be separated from the carbon oxides generated in the steam reforming reaction, and the separated hydrogen may be recycled to any of the reaction zones. Since hydrogen is an expensive resource, generating at least a portion of the required hydrogen from the undesired products of the reaction zones can decrease the cost of the process. This feature becomes more valuable when a an external source of hydrogen is not readily available.

In an alternative embodiment, catalytic reforming may be employed instead of steam reforming. In a typical catalytic reforming zone, the reactions include dehydrogenation, isomerization and hydrocracking. The dehydrogenation reactions typically will be the dehydroisomerization of alkylcyclopentanes to aromatics, the dehydrogenation of paraffins to olefins, the dehydrogenation of cyclohexanes to aromatics and the dehydrocyclization of acyclic paraffins and acyclic olefins to aromatics. The isomerization reactions included isomerization of n-paraffins to isoparaffins, the hydroisomerization of olefins to isoparaffins, and the isomerization of substituted aromatics. The hydrocracking reactions include the hydrocracking of paraffins. The aromatization of the n-paraffins to aromatics is generally considered to be highly desirable because of the high octane rating of the resulting aromatic product. In this application, the hydrogen generated by the reactions is also a highly desired product, for it is recycled to at least the deoxygenation zone. The hydrogen generated is recycled to any of the reaction zones, the hydrogenation/deoxygenation zone, the isomerization zone, and or the selective cracking zone.

Figure 2:
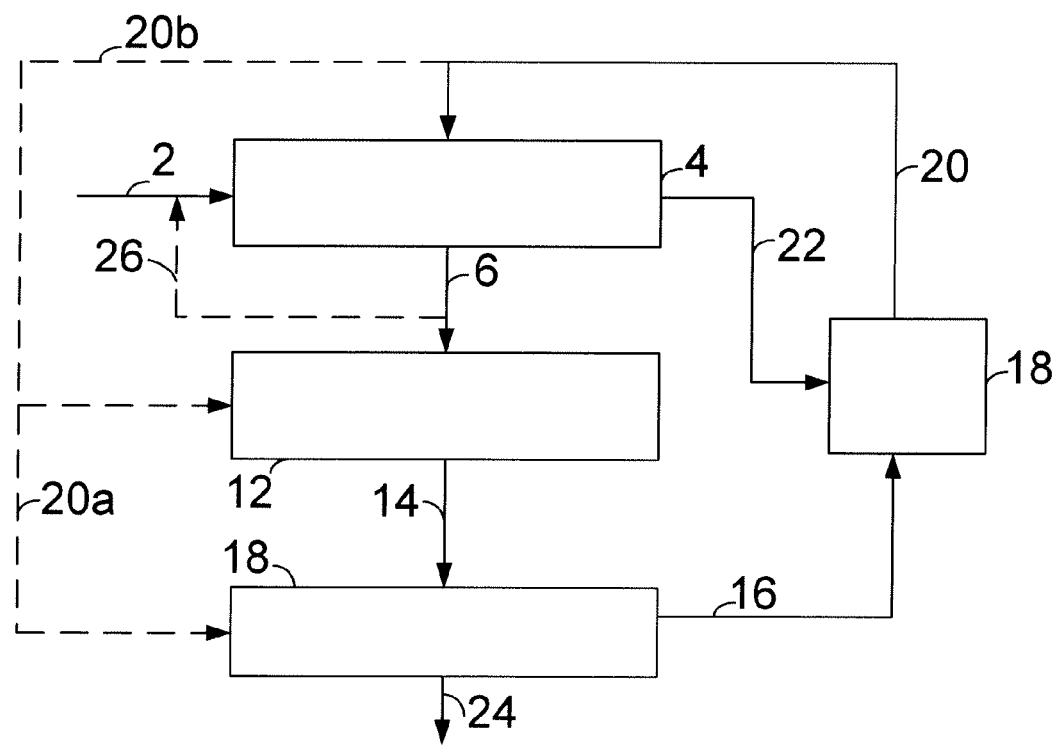
FIG. 2 is a general flow scheme diagram of the invention where selective cracking occurs before the isomerization.
Figure 3:
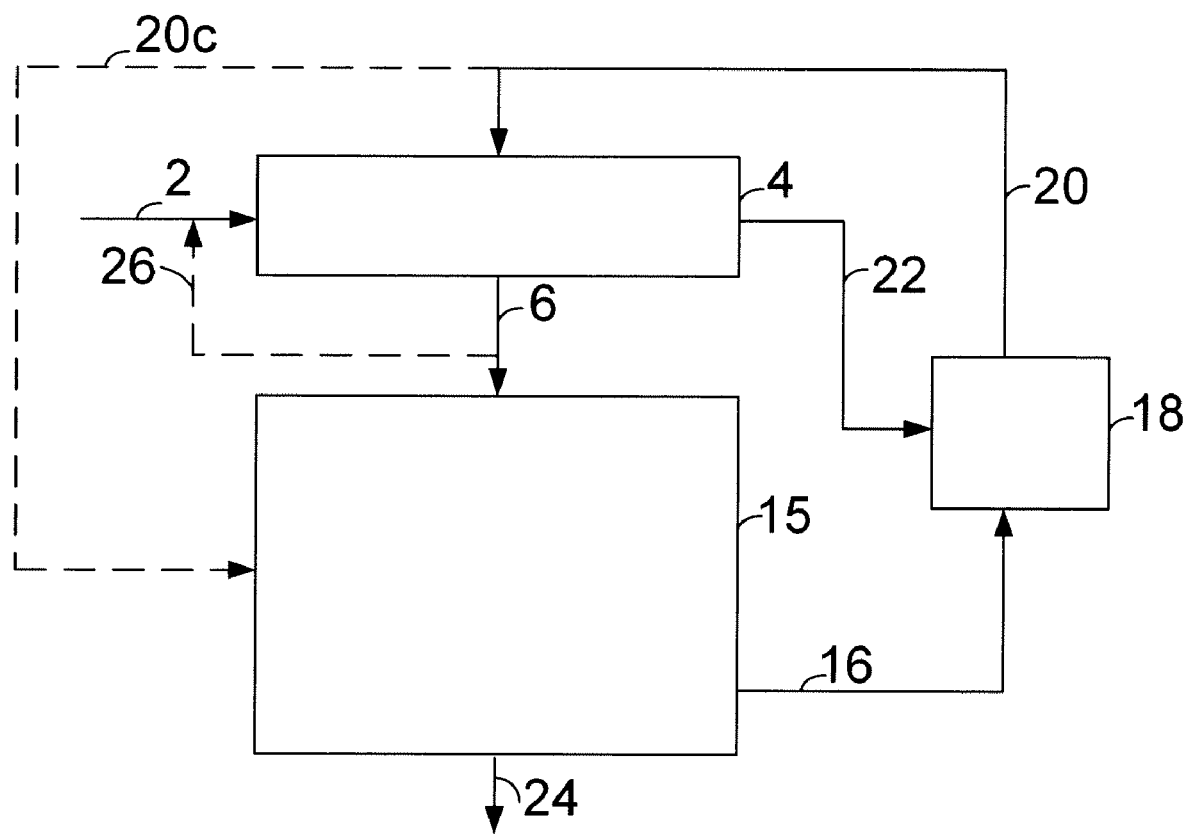
FIG. 3 is a general flow scheme diagram of the invention where isomerization occurs concurrently with the selective cracking.
Figure 4:
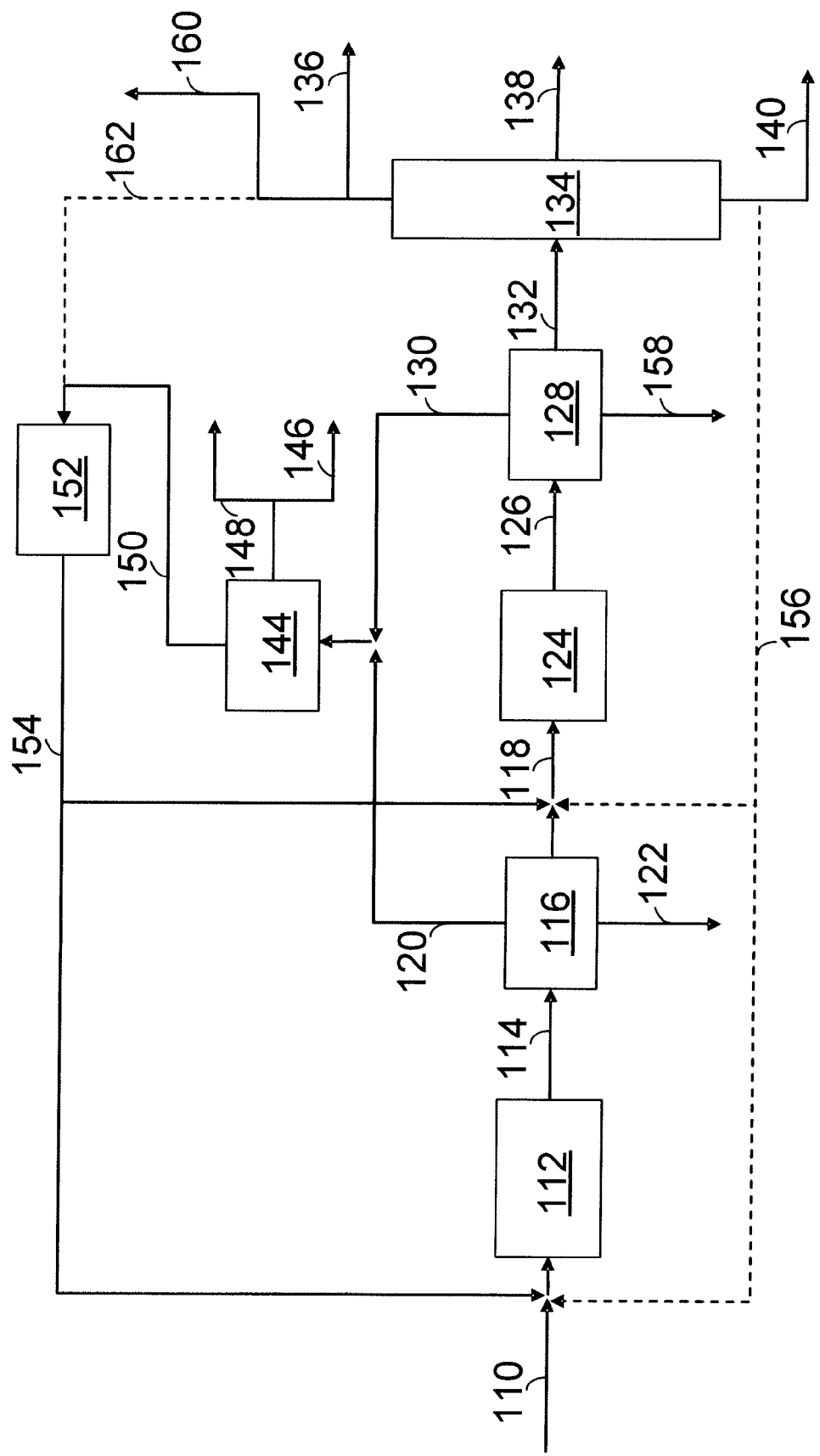
FIG. 4 is a schematic of one embodiment of a process for generating the cyclic rich component.

Turning to the figures, three general flow schemes are shown with FIG. 1 showing the sequence of reaction zones as a dexoygenation zone followed by an isomerization zone followed by a selective cracking zone. In FIG. 2, the order of the isomerization zone and selective cracking zone is reversed as compared to FIG. 1. In FIG. 3, the isomerization zone and the selective cracking zone are combined into a single combined zone.

In FIG. 1, renewable feedstock 2 enters deoxygenation reaction zone 4 along with recycle hydrogen stream 20 and optional product recycle 26. Contacting the renewable feedstock with the deoxygenation catalyst generates deoxygenated product 6 which is directed to isomerization zone 8. Carbon oxides, possibly hydrogen sulfide, and water vapor may be removed from the reaction mixture (not shown). $C_3$ and lighter components may be separated and removed in line 22 and conducted to reforming zone 18. Optionally, line 22 may contain the $C_3$ and light components as well as the carbon oxides, possibly hydrogen sulfide, and water vapor, thus eliminating a separation. The deoxygenated liquid product is passed to the isomerization reaction zone 8 for conversion of normal paraffins to branched paraffins. Branched paraffin effluent 10 of isomerization zone 8 is passed to selective cracking zone 12 to crack the higher carbon number paraffins and form paraffins in the desired aviation fuel range. After selective cracking the desired aviation fuel range of paraffin-rich product is collected via line 24 and the $C_8$ and lighter components are separated and recycled via line 16 to reforming zone 18. Hydrogen generated in reforming zone 18 is recycled via line 20 to the deoxygenation zone 4. Optionally, hydrogen generated in reforming zone 18 is recycled via line 20a to the isomerization zone 8, and or via line 20b to the selective cracking zone 12. Other components may be removed from reforming zone 18 (not shown).

In FIG. 2, renewable feedstock 2 enters deoxygenation reaction zone 4 along with recycle hydrogen stream 20 and optional product recycle 26. Contacting the renewable feedstock with the deoxygenation catalyst generates deoxygenated product 6 which is directed to isomerization zone 8. Carbon oxides, possibly hydrogen sulfide, and water vapor may be removed from the reaction mixture (not shown). $C_3$ and lighter components may be separated and removed in line 22 and conducted to reforming zone 18. Optionally, line 22 may contain the $C_3$ and light components as well as the carbon oxides, possibly hydrogen sulfide, and water vapor, thus eliminating a separation. The deoxygenated liquid product is passed to selective cracking zone 12 to crack the higher carbon number paraffins and form paraffins in the desired aviation fuel range. Effluent of the selective cracking zone 12 is passed to the isomerization reaction zone 8 for conversion of normal paraffins to branched paraffins. After isomerization in isomerization zone 8 the desired aviation fuel range of paraffin-rich product is collected via line 24 and the $C_8$ and lighter components are separated and recycled via line 16 to reforming zone 18. Optionally, the liquid portion of the recycle in line 16 may be separated and sold as a product, added to a gasoline pool, or upgraded by other refinery processes (not shown). Hydrogen generated in reforming zone 18 is recycled via line 20 to the deoxygenation zone 4. Optionally, hydrogen generated in reforming zone 18 is recycled via line 20a to the isomerization zone 8, and or via line 20b to the selective cracking zone 12. Other components may be removed from reforming zone 18 (not shown).

In FIG. 3, renewable feedstock 2 enters deoxygenation reaction zone 4 along with recycle hydrogen stream 20 and optional product recycle 26. Contacting the renewable feedstock with the deoxygenation catalyst generates deoxygenated product 6 which is directed to isomerization zone 8. Carbon oxides, possibly hydrogen sulfide, and water vapor may be removed from the reaction mixture (not shown). $C_3$ and lighter components may be separated and removed in line 22 and conducted to reforming zone 18. Optionally, line 22 may contain the $C_3$ and light components as well as the carbon oxides, possibly hydrogen sulfide, and water vapor, thus eliminating a separation. The deoxygenated liquid product is passed to the combined isomerization and selective cracking zone 15 for both conversion of normal paraffins to branched paraffins and selective cracking of the higher carbon number paraffins to form paraffins in the desired aviation fuel range. After isomerization and selective cracking the desired aviation fuel range of paraffin-rich product is collected via line 24 and the C8 and lighter components are separated and recycled via line 16 to reforming zone 18. Hydrogen generated in reforming zone 18 is recycled via line 20 to the deoxygenation zone 4. Other components may be removed from reforming zone 18 (not shown).

The final effluent stream, i.e. the stream obtained after all reactions have been carried out, may be processed through one or more separation steps to obtain a purified hydrocarbon stream useful as an aviation fuel. Because the final effluent stream comprises both a liquid and a gaseous component, the liquid and gaseous components are separated using a separator. The separated liquid component comprises the product hydrocarbon stream useful as an aviation fuel. Further separations may be performed to remove naphtha and LPG from the product hydrocarbon stream. The separated gaseous component comprises mostly hydrogen and the carbon dioxide from the decarboxylation reaction. The carbon dioxide can be removed from the hydrogen by means well known in the art, reaction with a hot carbonate solution, pressure swing absorption, etc. Also, absorption with an amine in processes such as described in co-pending US applications U.S. application Ser. No. 12/193,176 and U.S. application Ser. No. 12/193,196 hereby incorporated by reference, may be employed. If desired, essentially pure carbon dioxide can be recovered by regenerating the spent absorption media. The hydrogen remaining after the removal of the carbon dioxide may be recycled to the reaction zone where hydrogenation primarily occurs and/or to any subsequent beds/reactors.

Finally, a portion of the product hydrocarbon is recycled to the hydrogenating and deoxygenating reaction zone. The recycle stream may be taken from the product hydrocarbon stream after the hydrogenating and deoxygenating reactor(s) and separation from gaseous components, and recycled back to the hydrogenating and deoxygenating reactor(s). Although possible, it is less preferred to take the recycle stream from the isomerized product since isomerized products are more susceptible to extensive cracking than the normal paraffins in the hydrogenating and deoxygenating reaction zone. A portion of a hydrocarbon stream may also be cooled down if necessary and used as cool quench liquid between the beds of the deoxygenation reaction zone to further control the heat of reaction and provide quench liquid for emergencies. The recycle stream may be introduced to the inlet of the deoxygenation reaction zone and/or to any subsequent beds or reactors. One benefit of the hydrocarbon recycle is to control the temperature rise across the individual beds. However, as discussed above, the amount of hydrocarbon recycle herein is determined based upon the desired hydrogen solubility in the reaction zone. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation.

The following example is presented in illustration of this invention and is not intended as an undue limitation on the generally broad scope of the invention as set out in the appended claims.

Example of Paraffin Rich Component

Deoxygenation of refined-bleached-deodorized (RBD) soybean oil over the deoxygenation catalyst CAT-DO was accomplished by mixing the RBD soybean oil with a 2500 ppm S co-feed and flowing the mixture down over the catalyst in a tubular furnace at conditions of about 330° C., 3447 kPa gauge (500 psig), LHSV of 1 $h^{-1}$ and an $H_2$/feed ratio of about 4000 scf/bbl. The soybean oil was completely deoxygenated and the double bonds hydrogenated to produce an n-paraffin mixture having predominantly from about 15 to about 18 carbon atoms; deoxygenation products CO, $CO_2$, $H_2O$, and propane; with removal of the sulfur as $H_2S$.

The n-paraffin product from the deoxygenation stage was fed over a cracking catalyst CAT-C1 in a second process step. The n-paraffin mixture having predominantly from about 15 to about 18 carbon atoms was delivered down flow over the cracking catalyst in a tubular furnace at conditions of about 280° C., 3447 kPa gauge (500 psig), 0.8 LHSV and an $H_2$/feed ratio of about 2500 scf/bbl. This step produced 50% jet fuel-range paraffins but the product was not highly isomerized to meet the required freeze point properties. Therefore, the product of this stage was fed over isomerization catalyst CAT-Iso in a similar tubular furnace at conditions of about 330° C., 3447 kPa gauge (500 psig), 1 LHSV, and an $H_2$/feed ratio of 2500 about scf/bbl. The product from this isomerization step was fractionated and the jet fuel range material (as defined in the specification for JP-8, MIL-DTL-83133) was collected. The final yield of jet fuel (normal and isoparaffins) was 36 wt-% of vegetable oil feed. The properties of final jet fuel produced are shown in Table 1.

TABLE 1

| Sample: | Freeze Point, ° C. | Flash Point, ° C. | Density, g/cc |
|---|---|---|---|
| JP-8 Specifications | −47 | 38 | 0.775 |
| Soybean oil aviation fuel range paraffin (CAT-DO + CAT-C1 + CATIso) | −52.6 | 53 | 0.759 |

In a second iteration of the experiment, the RBD soybean oil feed was again deoxygenated over CAT-DO using the same conditions as above. The deoxygenated paraffin product was then processed over CAT-C2 at conditions of about 270° C., 3447 kPa gauge (500 psig), 0.8 LHSV, and an $H_2$/feed ratio of approximately 8000 scf/bbl. However, this catalyst contained a selective cracking function that also produced a much higher iso/normal ratio paraffin product. Therefore, a separate isomerization processing step (the third step of the first example) was not required. Greater than 95% of the starting feed was converted to aviation range hydrocarbon products. After fractionation the jet fuel yield was 40 wt-% of the vegetable oil feed. The properties of this product also met the freeze and flash point requirements for JP-8 as defined by MIL-DTL-83133.

In another example, deoxygenation of refined canola oil over the deoxygenation catalyst CAT-DO was accomplished by mixing the canola oil with a 2500 ppm S co-feed and flowing the mixture down over the catalyst in a tubular furnace at conditions of about 330° C., 3447 kPa gauge (500 psig), LHSV of 1 $h^{-1}$ and an $H_2$/feed ratio of about 4000 scf/bbl. The soybean oil was completely deoxygenated and the double bonds hydrogenated to produce an n-paraffin mixture having predominantly from about 15 to about 18 carbon atoms; deoxygenation products CO, $CO_2$, $H_2O$, and propane; with removal of the sulfur as $H_2S$.

The n-paraffin product from the deoxygenation stage was fed over a selective cracking/isomerization catalyst in a second process step. The n-paraffin mixture was delivered down flow over the selective cracking/isomerization catalyst in a tubular furnace at conditions of about 355° C., 4140 kPa gauge (600 psig), 1.0 LHSV and an $H_2$/feed ratio of about 2100 scf/bbl. The product from this selective cracking and isomerization step was fractionated and the jet fuel range material (as defined in the specification for JP-8, MIL-DTL-83133) was collected. After fractionation, the two stage process produced 18 wt.-% jet fuel-range paraffins with a high iso/normal ratio. The properties of final jet fuel produced are shown in Table 2.

TABLE 2

| Sample | Freeze Point, ° C. | Flash Point, ° C. | Density, g/cc |
|---|---|---|---|
| BJP-8 Specifications | −47 max | 38 min | 0.775-0.840 |
| Canola oil aviation fuel range paraffin | −49 | 56 | 0.760 |

Generating the Cyclic Rich Component

The cyclic rich component may be one or more hydrocarbon streams, a diesel boiling point range product, an aviation boiling point range product, and a gasoline and naphtha boiling point range product from renewable feedstocks such as feedstocks originating from lignocellulose. The term "rich" is meant to indicate at least 40 mass-%. In the U.S. and worldwide, there are huge amounts of lignocellulosic material, or biomass, which is not utilized, but is left to decay, often in a landfill, or just in an open field or forest. The material includes large amounts of wood waste products, and leaves and stalks of crops or other plant material that is regularly discarded and left to decay in fields. The emergence of inedible lipid-bearing crops for the production of renewable diesel will also produce increased amounts of biomass post extraction, often known as meal. Growth of cellulosic ethanol will also produce large amounts of a lignin side product. Biomass includes, but is not limited to, lignin, plant parts, fruits, vegetables, plant processing waste, wood chips, chaff, grain, grasses, corn, corn husks, weeds, aquatic plants, hay, meal, paper, paper products, recycled paper and paper products, and any cellulose containing biological material or material of biological origin. This biomass material can be pyrolyzed to make a pyrolysis oil, but due to poor thermal stability, the high water content of the pyrolysis oil, often greater than 25%, high total acid number often greater than 100, low heating value, and phase incompatibility with petroleum based materials, pyrolysis oil has found little use.

This portion of the process substantially converts the pyrolysis oil from biomass into the cyclic rich component which may be naphtha, aviation, and diesel boiling range components, having low acidity, low water, low oxygen, and low sulfur content. The pyrolysis of the biomass to form the pyrolysis oil is achieved by any technique known in the art, see for example, Mohan, D.; Pittman, C. U.; Steele, P. H. Energy and Fuels, 2006, 20, 848-889. Once the pyrolysis oil is generated from the biomass, although optional, it is not necessary to separate the pyrolytic lignin from the pyrolysis oil before further processing, thereby eliminating a step previously employed in industry. The whole pyrolysis oil may be processed, without a portion of the aqueous phase being removed to enrich the pyrolysis oil in the pyrolytic lignin. The pyrolytic lignin contains potentially high value products in the form of aromatic and naphthenic compounds having complex structures that comprises aromatic rings that are linked by oxygen atoms or carbon atoms. These structures can be broken into smaller segments when decarboxylated, decarbonylated, or hydrodeoxygenated, while maintaining the aromatic ring structures. One desired product is at least one cyclic hydrocarbon-rich stream. However, this processing of the pyrolytic lignin may be accomplished in the presence of the rest of the pyrolysis oil and no separation of the pyrolytic lignin before processing is required. Pyrolytic lignin is a pyrolysis product of the lignin portion of biomass. It can be separated from the rest of the whole pyrolysis oil during the pyrolysis process or through post-processing to produce an additional aqueous phase, which includes pyrolysis products primarily from the cellulose and hemicellulose portion of the biomass. The pyrolysis process can convert all components in the biomass feedstock into products useful as fuels or fuel components after full deoxygenation of the pyrolysis oil product. The water soluble components can also be transformed to naphthenes and aromatics under pyrolysis conditions. The production of heavier molecular weight products is known from steam cracking technology to produce light olefins, also run under pyrolysis conditions. Even feeds such as ethane, propane, and light naphtha produce heavier side products in these thermal cracking processes. The amount of these heavier products depends on the conditions of the thermal cracking reactor. Optionally, the pyrolysis oil may be separated and only a portion of the pyrolysis oil be introduced to the partial deoxygenation zone.

The pyrolysis oil is fully deoxygenated in two separate zones, a partial deoxygenation zone and a full deoxygenation zone. The partial deoxygenation zone may also be considered to be a hydrotreating zone and the full deoxygenation zone may be considered to be a hydrocracking zone. "Full" deoxygenation is meant to include deoxygenating at least 99% of available oxygenated hydrocarbons. The zones will primarily be referred to herein as a partial deoxygenation zone and a full deoxygenation zone. In the partial deoxygenation zone, partial deoxygenation occurs at milder conditions than the full deoxygenation zone and uses a catalyst such as a hydrotreating catalyst. In general, the partial oxidation zone removes the most reactive and thermally instable oxygenates. The oxygen level of the pyrolysis oil feedstock, which typically ranges from about 35 wt. % to about 60 wt %, is reduced to a significantly lower level, from about 5 wt. % to about 20 wt. % in the partial deoxygenation zone. Water is reduced from pyrolysis oil feedstock levels from about 10 wt. % to about 40 wt. % to levels from about 2 wt. % to about 11 wt. %. The acidity is greatly reduced as well in the partial deoxygenation zone, from a TAN level of about 125 to about 200 in the pyrolysis oil feedstock to a reduced level from about 40 to about 100 in the partial deoxygenation zone effluent.

The more thermally stable effluent from the partial deoxygenation zone can then be fully deoxygenated in the full deoxygenation zone. In the full deoxygenation zone, a hydrocracking catalyst, which has higher activity as compared to the hydrotreating catalyst, is employed with the option of more severe process conditions in order to catalyze the deoxygenation of less reactive oxygenates. Some hydrocracking of feedstock molecules will also occur to a higher extent than in the partial deoxygenation zone. In the full deoxygenation zone, oxygen content is reduced from about 5 wt. % to about 20 wt. % to much lower levels, from ppm concentrations to about 0.5 wt. %. Water is also greatly reduced in the full deoxygenation zone, from about 2 wt. % to about 11 wt. % down to levels from about 100 ppm to about 1000 ppm. The acidity is greatly reduced from initial TAN levels of about 40 to about 100 mg KOH/g oil to lower levels from about 0.5 to about 4 mg KOH/g oil. The effluent of the full deoxygenation zone is a hydrocarbon mixture rich in naphthenes and aromatics.

In one embodiment, as shown in FIG. 2, pyrolysis oil 110 is not separated and enters partial deoxygenation zone 112 along with recycle hydrogen stream 154 and optional hydrocarbon recycle 156 where contact with a deoxygenation and hydrogenation catalyst at deoxygenation conditions generates partially deoxygenated pyrolysis oil stream 114. The deoxygenation zone 112 performs catalytic decarboxylation, decarbonylation, and hydrodeoxygenation of oxygen polymers and single oxygenated molecules in the pyrolysis oil by breaking the oxygen linkages, and forming water and $CO_2$ from the oxygen and leaving smaller molecules. For example, the phenylpropyl ether linkages in the pyrolytic lignin will be partially deoxygenated producing some aromatic rings, such as alkylbenzenes and polyalkylbenzenes. Very reactive oxygenates will be deoxygenated as well, including small molecular weight carboxylic acids therefore greatly increasing the thermal stability of the product. Pyrolysis oil components not derived from lignin, including cellulose, hemicellulose, free sugars, may yield products such as acetic acid, furfural, furan, levoglucosan, 5-hydroxymethylfurfural, hydroxyacetaldhyde, formaldehyde, and others such as those described in Mohan, D.; Pittman, C. U.; Steele, P. H. Energy and Fuels, 2006, 20, 848-889. Therefore, pyrolysis oil components not derived from lignin will also be partially or fully deoxygenated with the carbohydrates giving primarily light hydrocarbon fractions and water. The light hydrocarbon fractions may contain hydrocarbons with six or fewer carbon atoms. The reactions of decarbonylation, decarboxylation and hydrodeoxygenation are collectively referred to as deoxygenation reactions. Hydrogenation of olefins also occur in this zone. The catalysts and conditions of partial deoxygenation zone 112 are selected so that the more reactive compounds are deoxygenated. The effluent of partial deoxygenation zone is a partially deoxygenated pyrolysis oil stream 114 that has increased thermal stability as compared to the feed pyrolysis oil.

Partially deoxygenated pyrolysis oil stream 114 is passed to a separation zone 116. Carbon oxides, possibly hydrogen sulfide, and C3 and lighter components are separated and removed in overhead line 120 and a partially deoxygenated product stream 118 is removed from separation zone 116. Separation zone 116 may comprise a separator. Depending upon whether the separator is operated in a hot or cold mode, the water may be removed as a vapor in line 120 (hot separator mode) or as a liquid in line 122 (cold separator mode). Overhead line 120 comprises a large quantity of hydrogen and at least the carbon dioxide from the decarboxylation reaction. The carbon dioxide can be removed from the hydrogen by means well known in the art such as reaction with a hot carbonate solution, pressure swing absorption, etc. Also, absorption with an amine in processes such as described in co-pending applications U.S. application Ser. No. 12/193,176 and U.S. application Ser. No. 12/193,196, hereby incorporated by reference, may be employed. If desired, essentially pure carbon dioxide can be recovered by regenerating the spent absorption media. Therefore overhead line 120 is passed through one or more scrubbers 144 such as amine scrubbers to remove carbon dioxide in line 46 and hydrogen sulfide in line 148. Depending upon the scrubber technology selected some portion of water may also be retained by the scrubber. The lighter hydrocarbons and gasses, possibly including a portion of water, are conducted via line 150 to steam reforming zone 152. In one embodiment the light hydrocarbon fractions may contain hydrocarbons with six or fewer carbon atoms. After purification, hydrogen generated in steam reforming zone 152 is conducted via line 154 to combine with feedstock 110 and partially deoxygenated product stream 118. The hydrogen may be recycled to combine with the feedstock as shown or may be introduced directly to the reaction zone where hydrogenation primarily occurs and/or to any subsequent reactor beds.

The partially deoxygenated product stream 118 along with recycle hydrogen stream 154 and optional hydrocarbon recycle 156, is passed to a second hydrodeoxygenation zone 124, where the remaining oxygen is removed. Full deoxygenation zone 124 performs catalytic decarboxylation, decarbonylation, and hydrodeoxygenation of the remaining oxygen compounds that are more stable than those reacted in the first stage. Therefore, a more active catalyst and more severe process conditions are employed in full deoxygenation zone 124 as compared to partial deoxygenation zone 112 in order to catalyze full deoxygenation.

Full deoxygenation zone effluent 126 is introduced to phase separator 128. Carbon oxides, possibly hydrogen sulfide and C3 and lighter components are separated and removed in line 30 and liquid hydrocarbons are removed in line 132. Depending upon whether the separator is operated in a hot or cold mode, the water may be removed as a vapor in line 130 (hot separator mode) or as a liquid in line 158 (cold separator mode). The overhead in line 130 comprises a large quantity of hydrogen and the carbon dioxide from the decarboxylation reaction. The carbon dioxide can be removed from the hydrogen by means well known in the art, reaction with a hot carbonate solution, pressure swing absorption, etc. Also, absorption with an amine in processes such as described in co-pending U.S. application Ser. No. 12/193,176 and U.S. application Ser. No. 12/193,196, hereby incorporated by reference, may be employed. If desired, essentially pure carbon dioxide can be recovered by regenerating the spent absorption media. Therefore line 130 is passed through one or more scrubbers 144 such as amine scrubbers to remove carbon dioxide in line 146 and hydrogen sulfide in line 148. Depending upon the scrubber technology selected some portion of water may also be retained by the scrubber. The lighter hydrocarbons and gasses, possibly including a portion of water, are conducted via line 150 to steam reforming zone 152. A liquid stream containing hydrocarbons is removed from separator 128 in line 132 and conducted to product fractionation zone 134. Product fractionation zone 134 is operated so that product cut 136 contains the hydrocarbons in a boiling range most beneficial to meeting the gasoline specifications. Product cut 138 is collected for use as aviation fuel or as a blending component of aviation fuel. The lighter materials such as naphtha and LPG are removed in fractionation zone overhead stream 160. A portion of stream 160 may be optionally conducted in line 162 to the reforming zone 152. If desired, the naphtha and LPG may be further separated into an LPG stream and a naphtha stream (not shown).

Hydrocarbons that have a boiling point higher than acceptable for the specification of the aviation fuel are removed in bottoms stream 140. A portion of bottoms stream 140 may be recovered and used as fuel such as, for example, low sulfur heating oil fuel. It is likely that bottoms stream 140 may be acceptable for use as diesel or a diesel blending component. Alternatively, bottoms stream 140 could be upgraded to diesel in a separate process. A portion of bottoms stream 140 is optionally recycled to partial deoxygenation zone 112 and/or full deoxygenation reaction zone 124.

The cyclic rich component may be any of streams 132, 136, 138, 160, or any mixture thereof.

A portion of a hydrocarbon stream may also be cooled down if necessary and used as cool quench liquid between beds of one of the deoxygenation zones, or between the first and the full deoxygenation zone to further control the heat of reaction and provide quench liquid for emergencies. The recycle stream may be introduced to the inlet of one or both of the reaction zones and/or to any subsequent beds or reactors. One benefit of the hydrocarbon recycle is to control the temperature rise across the individual beds. However, as discussed within, the amount of hydrocarbon recycle may be is determined based upon the desired hydrogen solubility in the reaction zone. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation. The fractionation zone may contain more than one fractionation column and thus the locations of the different streams separated may vary from that shown in the figures.

In another embodiment, the pyrolysis oil feed stream is separated to remove at least a portion of the aqueous phase thereby concentrating the amount of pyrolytic lignin left in the pyrolysis oil and generating a pyrolytic lignin-enriched pyrolysis oil. The separation may be accomplished by passing the pyrolysis oil through a phase separator where it is separated into an aqueous phase and a pyrolytic lignin phase and removing at least a portion of the aqueous phase.

In another embodiment, both deoxygenation zones are housed in a single reactor. The deoxygenation zones may be combined through the use of a multifunctional catalyst capable of deoxygenation and hydrogenation or a set of catalysts. Or a reactor housing two separate zones, such as a stacked bed reactor, may be employed. For example, partial deoxygenation and hydrogenation can occur over the first catalyst in a first portion of a reactor, a first zone, while full deoxygenation occurs with a more active catalyst in a second portion the reactor, a second zone. A stacked bed configuration may be advantageous because a less active catalyst in an upper zone will deoxygenate the most reactive oxygen compounds without generating exotherms that can promote the formation of thermal coke.

Hydrogen is needed for the deoxygenation and hydrogenation reactions above, and to be effective, a sufficient quantity of hydrogen must be in solution in the deoxygenation zone to most effectively take part in the catalytic reaction. If hydrogen is not available at the reaction site of the catalyst, the coke forms on the catalyst and deactivates the catalyst. High operating pressures may be used in order to achieve a desired amount of hydrogen in solution and readily available for reaction and to avoid coking reactions on the catalyst. However, higher pressure operations are more costly to build and to operate as compared to their lower pressure counterparts.

The desired amount of hydrogen may be kept in solution at lower pressures by to employing a large recycle of hydrocarbon. An added benefit is the control of the temperature in the deoxygenation zone(s) since the deoxygenation reactions are exothermic reactions. However, the range of recycle to feedstock ratios used herein is set based on the need to control the level of hydrogen in the liquid phase and therefore reduce the deactivation rate of the catalyst. The amount of recycle is determined not on temperature control requirements, but instead, based upon hydrogen solubility requirements. Hydrogen has a greater solubility in the hydrocarbon product than it does in the pyrolysis oil feedstock or the portion of the pyrolysis oil feedstock after separation. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. The hydrocarbon recycle may be a portion of the stream in any of lines 132, 140, 138, or 136, or any combination thereof, and the hydrocarbon recycle is directed to deoxygenation zone 112. The figure shows optional hydrocarbon recycle 156 as a portion of diesel boiling point range component 140. However it is understood that in other embodiments portions different streams or combinations of stream such as the product stream 132 or any of fractionation zone streams 138, 136, 160 may be used as the hydrocarbon recycle. Suitable volume ratios of hydrocarbon recycle to pyrolysis oil feedstock is from about 2:1 to about 8:1. In another embodiment the ratio is in the range of about 3:1 to about 6:1 and in yet another embodiment the ratio is in the range of about 4:1 to about 5:1.

Furthermore, the rate of reaction in the deoxygenation zone is increased with the hydrocarbon recycle resulting in a greater amount of throughput of material through the reactor in a given period of time. Lower operating pressures provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint.

In another embodiment, mixtures or co-feeds of the pyrolysis oil and other renewable feedstocks or petroleum derived hydrocarbons may also be used as the feedstock to the deoxygenation zone. The mixture of the pyrolysis oil and another renewable feedstock or a petroleum derived hydrocarbon is selected to result in greater hydrogen solubility. Other feedstock components which may be used as a co-feed component in combination with the pyrolysis oil from the above listed biomass materials, include spent motor oil and industrial lubricants, used paraffin waxes, liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. One advantage of using a co-feed component is the transformation of what has been considered to be a waste product from a petroleum based or other process into a valuable co-feed component to the current process.

The partial deoxygenation zone is operated at a pressure from about 3.4 MPa (500 psia) to about 14 MPa (3000 psia), and preferably is operated at a pressure from about 3.4 MPa (500 psia) to about 12 MPa (1800 psia). The partial deoxygenation zone is operated at a temperature from about 200° C. to 400° C. with one embodiment being from about 300° C. to about 375° C. The partial deoxygenation zone is operated at a space velocity from about 0.1 LHSV h$^{-1}$ to 1.5 LHSV h$^{-1}$ based on pyrolysis oil feedstock; this space velocity range does not include any contribution from a recycle stream. In one embodiment the space velocity is from about 0.25 to about 1.0 LHSV h$^{-1}$. The hydrogen to liquid hydrocarbon feed ratio is at about 5000 to 20000 scf/bbl with one embodiment being from about 10,000 to 15,000 scf/bbl. The catalyst in the partial deoxygenation zone is any hydrogenation and hydrotreating catalysts well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina or activated carbon. Another example includes the catalysts disclosed in U.S. Pat. No. 6,841,085, hereby incorporated by reference.

In the full deoxygenation zone, the conditions are more severe and the catalyst more active compared to that of the partial deoxygenation zone. The catalyst is any hydrocracking catalyst, having a hydrocracking function, that is well known in the art such as nickel or nickel/molybdenum dispersed on a high surface area support. Another example is a combined zeolitic and amorphous silica-alumina catalyst with a metal deposited on the catalyst. The catalyst includes at least one metal selected from nickel (Ni), chromium (Cr), molybdenum (Mo), tungsten (W), cobalt (Co), rhodium (Rh), iridium (Ir), ruthenium (Ru), and rhenium (Re). In one embodiment, the catalyst includes a mixture of the metals Ni and Mo on the catalyst. The catalyst is preferably a large pore catalyst that provides sufficient pore size for allowing larger molecules into the pores for cracking to smaller molecular constituents. The metal content deposited on the catalysts used are deposited in amounts ranging from 0.1 wt. % to 20 wt. %, with specific embodiments having values for the metals including, but not limited to, nickel in a range from 0.5 wt. % to 10 wt. %, tungsten in a range from 5 wt. % to 20 wt. %, and molybdenum in a range from 5 wt. % to 20 wt. %. The metals can also be deposited in combinations on the catalysts with example combinations being Ni with W, and Ni with Mo. Zeolites used for the catalysts include, but are not limited to, beta zeolite, Y-zeolite, MFI type zeolites, mordenite, silicalite, SM3, and faujasite. The catalysts are capable of catalyzing decarboxylation, decarbonylation and/or hydrodeoxygenation of the feedstock to remove oxygen as well as hydrogenation to saturate olefins. Cracking may also occur. Decarboxylation, decarbonylation, and hydrodeoxygenation are herein collectively referred to as deoxygenation reactions.

The full deoxygenation zone conditions include a relatively low pressure of about 6890 kPa (1000 psia) to about 13,790 kPa (2000 psia), a temperature of about 300° C. to about 500° C. and a liquid hourly space velocity of about 0.1 to about 3 hr$^{-1}$ based on fresh feed not recycle. In another embodiment the deoxygenation conditions include the same pressure of about 6890 kPa (1000 psia) to about 6895 kPa (1700 psia), a temperature of about 350° C. to about 450° C. and a liquid hourly space velocity of about 0.15 to about 0.40 hr$^{-1}$. It is envisioned and is within the scope of this invention that all the reactions are occurring simultaneously within a zone.

Example of Cyclic Rich Component

A whole mixed-wood pyrolysis oil feedstock was fed once-through a fixed bed reactor loaded with a hydrotreating catalyst at the conditions specified for partial deoxygenation zone (Zone 1) in Table 3 below. The effluent oil was isolated after separation of water generated in the reaction. The properties of the effluent oil from the partial deoxygenation zone are also shown in Table 3. The partially deoxygenated effluent oil from the partial deoxygenation zone was then fed to a full deoxygenation zone and contacted with a second catalyst at the elevated process conditions shown in Table 3. This second catalyst was a sulfided nickel and molybdenum on alumina catalyst produced by UOP. The overall volumetric yield of hydrocarbon that was isolated from the effluent of the full deoxygenation zone was about 51 vol % of the initial whole mixed-wood pyrolysis oil feedstock.

A whole pyrolysis oil feedstock produced from corn stover was fed once-through a fixed bed reactor loaded with a hydrotreating catalyst at the conditions specified for the partial deoxygenation zone (Zone 1) in Table 4 below. The effluent oil was isolated after separation of water generated in the reaction. The properties of the effluent oil from the partial deoxygenation zone are also shown in Table 4. The partially deoxygenated effluent from the partial deoxygenation zone was then fed over a second catalyst in a full oxygenation zone at the elevated process conditions shown. This second catalyst was a sulfided nickel molybdenum on alumina catalyst produced by UOP. The overall volumetric yield of hydrocarbon isolated from the effluent of the full deoxygenation zone was about 67 vol % of the initial whole pyrolysis oil feedstock produced from corn stover.

The third example again shows the complete deoxygenation of a whole pyrolysis oil produced from corn stover. The pyrolysis oil was fed once-through over a stacked fixed bed reactor. The upper zone of the reactor, the partial deoxygenation zone, was loaded with a milder hydrotreating catalyst run 250° C. as shown in table 5. The bottom zone of the reactor, the full deoxygenation zone, was loaded a sulfided nickel and molybdenum on alumina catalyst produced by UOP and kept at 400° C. The other process variables are shown in Table 5. This example shows that a single reactor with stacked catalyst beds is capable of full deoxygenation to produce a hydrocarbon product.

TABLE 3

| Zone | Pressure kPa g (psig) | Temp. (C.) | LHSV (h-1) | H2/oil (scf/bbl) | Oil yield (vol %) | Effluent Properties O (wt %) | $H_2O$ | TAN (mg KOH/ g oil) |
|---|---|---|---|---|---|---|---|---|
| 1: Partial Deoxygenation (Hydrotreating) | 13,858 (2010) | 315 | 0.25 | 18000 | 70% | 10.9% | 2.4 wt % | 51 |
| 2: Full Deoxygenation (Hydrocracking) | 10,411 (1510) | 405 | 0.25 | 14000 | 73% | 0.4% | 113 ppm | 2.6 |

TABLE 4

| Zone | Pressure kPa g (psig) | Temp. (C.) | LHSV (h-1) | H2/oil (scf/bbl) | Oil yield (vol %) | Effluent Properties O (wt %) | $H_2O$ | TAN (mg KOH/ g oil) |
|---|---|---|---|---|---|---|---|---|
| 1: Partial Deoxygenation (Hydrotreating) | 13,445 (1950) | 340 | 0.2 | 14000 | 79% | 12.8% | 3.2% | 47 |
| 2: Full Deoxygenation (Hydrocracking) | 10,514 (1525) | 407 | 0.19 | 13700 | 85% | 0.4% | 450 ppm | 1.6 |

TABLE 5

| Zone | Pressure kPa g (psig) | Temp. (C.) | LHSV (h-1) | H2/oil (scf/bbl) | Oil yield (vol %) | Effluent Properties O (wt %) | $H_2O$ | TAN (mg KOH/ g oil) |
|---|---|---|---|---|---|---|---|---|
| 1. Upper Zone of Reactor (Partial Deoxygenation) | 13,445 (1950) | 250 | 0.14 | 10500 | 0.25 | 0.0035 | 300 ppm | 1.6 |
| 2: Bottom Zone of Reactor (Full Deoxygenation) | | 400 | | | | | | |

Table 6 shows the typical distribution of hydrocarbon classes produced after full deoxygenation of whole pyrolysis oil. The final distribution depends on the feedstock processed, catalyst choice, and process conditions. The distribution of the final product from example 2 above is shown in the "Example 2 Product" column of Table 6. This represents a hydrocarbon product produced from solid corn stover pyrolysis oil processed as described in Table 4.

TABLE 6

| Hydrocarbon class | Min (wt %) | Max (wt %) | Example 2 Product |
|---|---|---|---|
| n-paraffins | 5 | 10 | 8.3 |
| isoparaffins | 15 | 25 | 15.5 |
| olefins | 0.1 | 1 | 0.2 |
| naphthene | 35 | 55 | 52.4 |
| aromatic | 10 | 35 | 23.5 |
| oxygenate | 0.1 | 0.8 | 0.1 |

Figure 5:
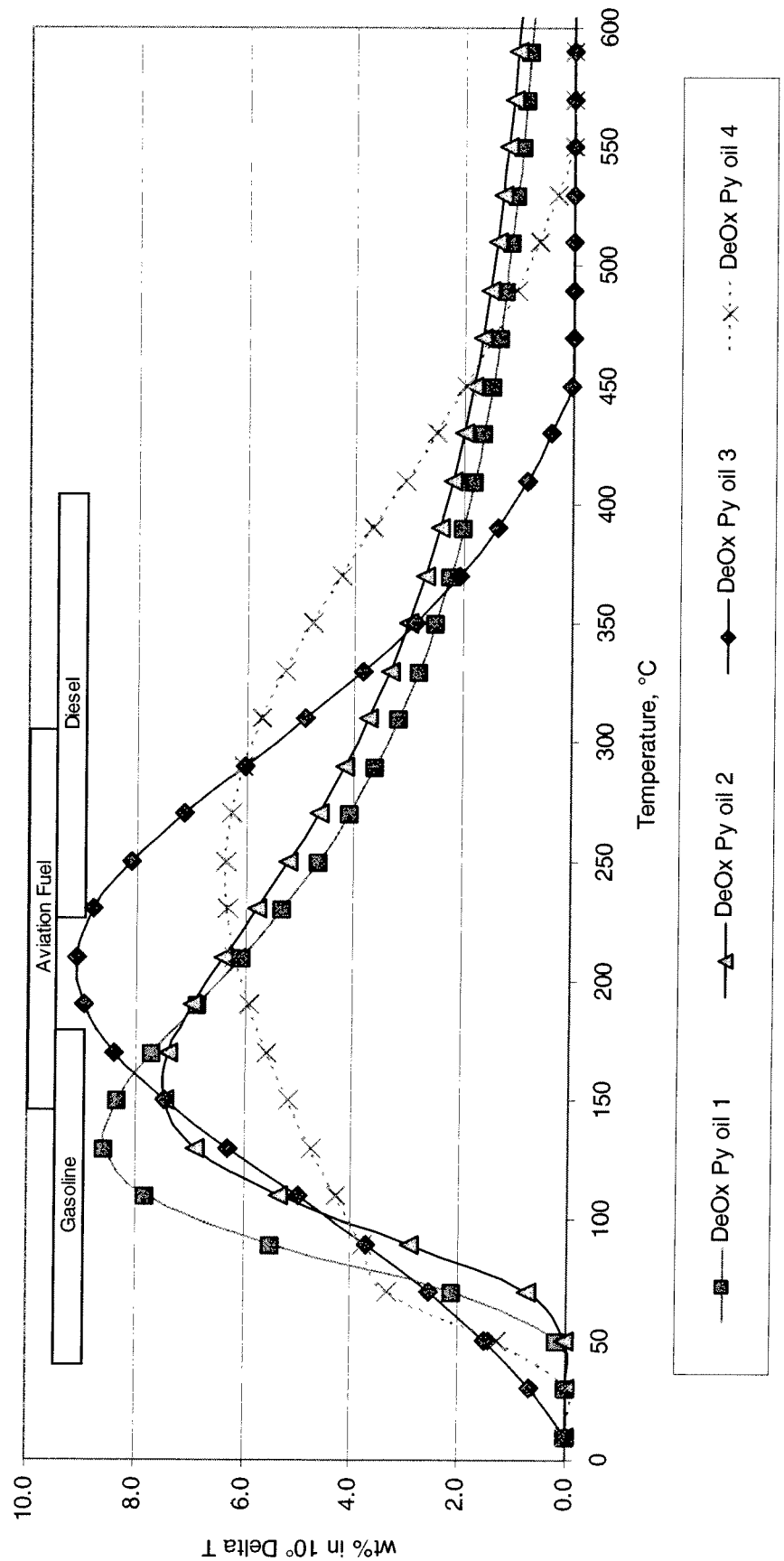
FIG. 5 is a plot of the boiling point distribution of several fully deoxygenated pyrolysis oils suitable as the cyclic component which shows the hydrocarbon products produced have a wide boiling point range with significant fractions in the range for each fuel.

The boiling point distribution of several fully deoxygenated pyrolysis oils is shown in FIG. 5. As shown the hydrocarbon product produced has a wide boiling point range with significant fractions in the range for each fuel. Some heavier components are also present that fall outside the range of gasoline, aviation fuel, and diesel. These heavy components could be recycled back into the second zone for further hydrocracking or be isolated for other industrial uses.

Blending the Paraffin Rich Component and the Cyclic Rich Component

At least one paraffin rich component and at least one cyclic rich component are blended to produce a target fuel. The target fuel may be in the gasoline boiling point range, in the aviation boiling point range, or multiple fuels may be produced in any combination of the boiling point ranges. Other components or additives may be incorporated into the blending so that the target fuel meets additional specifications. Many fuels are defined by a set of physical and chemical specifications. For a blend to be called a certain type of fuel, it must meet the required specifications. If a first component does not meet the desired specifications, one or more additional components are blended with the first component so that the final blended product meets the desired specifications. For example, the paraffin rich component obtained above may not meet a particular specification of a target fuel. Blending of the paraffin rich component with the cyclic component would enable the blended fuel to meet at least some of the specifications. The relative amounts of the components being blended is determined by the specification to be met and the influence each component has on the specification. As an example, the paraffin rich component may not meet the density requirement for specific types of jet fuel such as JP-8. But when blended with a cyclic rich component, the blended fuel now meets the density requirements. Blending must be conducted with accounting for all the specifications to be met. For example, the blending of the paraffin rich component and the cyclic rich component to meet the density requirements of JP-8, must also take into consideration meeting the cloud point requirement, flash point requirement, and other requirements for the target fuel. Models and algorithms may be employed to assist in determine the relative amounts of the components being blended.

A particular advantage of blending the paraffin rich component and the cyclic rich component is that the resulting target fuel comprises at least two components that were produced from renewable feedstocks. If the target fuel can be produced through the blending of these two components, then the target fuel would be wholly derived from renewable sources. Another advantage of some embodiments of the invention is the opportunity to produce the paraffin rich component and the cyclic rich component from the same renewable source. For example, corn or soy beans may be processed to produce vegetable oil which is the feedstock to the process which produces the paraffin rich component. Biomass is a byproduct of the corn or soy bean processing to produce vegetable oil. This biomass may be pyrolyzed to generate the pyrolysis oil that is the feedstock to the process which produces the cyclic rich component. Therefore, a single renewable source, such as the corn or soybeans, provide the feedstocks to both of the processes, one generating the paraffin rich component and one generating the cyclic rich component. Corn and soybeans are merely illustrative of the concept, and the single renewable source may be any of those sources which provide the renewable feedstocks discussed above.

Another possible advantage includes integrating the process which produces the paraffin rich component and the process which produces the cyclic rich component. One point of integration is the product fractionation zone. It is envisioned that the product fractionation zone of the process to generate the paraffin rich component and the fractionation zone of the process to generate the cyclic rich component may be integrated. In this embodiment, the blending of the two components occurs prior to the fractionation of the combined product streams.

Table 7 shows one example of a benefit of blending renewable-derived feedstocks as described herein. Freeze point, flash point and density are key specifications for aviation fuels. Line 2 of Table 7 shows that the paraffin rich component produced by hydrodeoxygenation, hydroisomerization and partial hydrocracking of soybean oil gives, upon fractionation, a fuel product that meets aviation fuel specification for freeze point and flash point but not for density (MTL-DTL-83 133). Similarly, hydrocarbon derived by hydrodeoxygenation of pyrolysis oil from corn stover (Line 3 of Table 7) or wood (Line 4 of Table 7) do not meet density specification. Blends of the soybean oil-derived paraffin component with the cyclic rich component derived from pyrolysis oil, however, do meet the density specification (Lines 5 and 6 of Table 7). Specific blends are prepared according to the properties of the individual components and the properties of the desired final hydrocarbon fuel. Thus a clear benefit in fuel quality by blending renewable-derived hydrocarbon components has been demonstrated.

TABLE 7

Aviation Fuel Properties from Renewable-Derived Feedstocks and Blends

| | Sample | Vol % pyrolysis oil hydrocarbon | Freeze Point, ° C. (max) | Flash Point, ° C. (min) | Density, g/cc |
|---|---|---|---|---|---|
| 1 | JP-8 Specifications | | −47 | 38 | 0.775-0.840 |
| 2 | Soybean Oil Paraffin | 0% | −52.6 | 53 | 0.759 |

TABLE 7-continued

Aviation Fuel Properties from Renewable-Derived Feedstocks and Blends

| | Sample | Vol % pyrolysis oil hydrocarbon | Freeze Point, °C. (max) | Flash Point, °C. (min) | Density, g/cc |
|---|---|---|---|---|---|
| 3 | Corn Stover-derived Pyrolysis Oil Hydrocarbon | 100 | −53 | Nd | 0.878 |
| 4 | Wood-derived Pyrolysis Oil Hydrocarbon | 100 | −85 | Nd | 0.852 |
| 5 | Corn Stover/Soy Oil-derived Hydrocarbon Blend | 25 | −56 | 49 | 0.790 |
| 6 | Wood/Soy Oil-derived Hydrocarbon Blend | 25 | −54 | 54 | 0.782 |

The invention claimed is:

1. A process for producing a blended fuel from renewable feedstocks comprising;
  a) generating at least one paraffin rich component from a first renewable feedstock comprising at least glycerides and free fatty acids, the steps comprising:
    i) hydrogenating and deoxygenating the first renewable feedstock by contacting the first renewable feedstock with a hydrogenation and deoxygenation catalyst in the presence of hydrogen and at hydrogenation and deoxygenation conditions to provide n-paraffins;
    ii) isomerizing at least a portion of the n-paraffins by contacting with an isomerization catalyst at isomerization conditions to generate branched-paraffins;
    iii) selectively cracking the n-paraffins, the branched-paraffins, or a mixture thereof by contacting with a selective cracking catalyst at selective cracking conditions to generate the paraffin rich component;
  b) generating a cyclic rich component from a second renewable feedstock comprising pyrolysis oil, the steps comprising:
    i) partially deoxygenating the pyrolysis oil in a first pyrolysis oil deoxygenation zone by contacting the pyrolysis oil with a first deoxygenation and hydrogenation catalyst in the presence of hydrogen at deoxygenation conditions to produce a partially deoxygenated pyrolysis oil stream comprising water, gasses, light ends, and hydrocarbons;
    ii) passing the partially deoxygenated pyrolysis oil stream to a separation zone to separate a water, gasses, and light ends stream from a remainder stream wherein the light ends of the water, gasses, and light ends stream are processed other than blending with the cyclic rich component of step b)iii);
    iii) passing the remainder stream to a second pyrolysis oil deoxygenation zone and deoxygenating the remainder stream by contacting with a second deoxygenation catalyst under deoxygenation conditions, to generate a cyclic rich component comprising cyclic hydrocarbon compounds useful as a fuel or a fuel blending component in the boiling point ranges of gasoline, aviation, diesel, and any combination thereof; and
  c) blending at least a portion of the paraffin rich component and at least a portion of the cyclic rich component to form at least one blended fuel selected from the group consisting of a gasoline boiling point range blended fuel, an aviation boiling point range blended fuel, or any combination thereof.

2. The process of claim 1 further comprising separating the paraffin rich component into a naphtha boiling point range paraffin rich component and an aviation boiling point range paraffin rich component and separating the cyclic rich component into at least a naphtha boiling point range cyclic rich component and an aviation boiling point range cyclic rich component.

3. The process of claim 1 wherein the blended fuel produced in claim 1(c) is a mixture of gasoline boiling point range blended fuel and aviation boiling point range blended fuel, said process further comprising separating the blended fuel produced in claim 1(c) in a fractionation zone to separate the gasoline boiling point range blended fuel and the aviation boiling point range blended fuel.

4. The process of claim 1 wherein the first and second renewable feedstocks are at least partially derived from the same renewable source.

5. The process of claim 1 further comprising recycling a portion of the n-paraffins to step 1(a)(i) at a volume ratio of recycle to first renewable feedstock in the range of about 2:1 to about 8:1.

6. The process of claim 1 further comprising recycling a portion of the cyclic rich component to the partial deoxygenation zone, the full deoxygenation zone, or both wherein the volume ratio of recycle to feed to the deoxygenation zone is in the range of about 2:1 to about 8:1.

7. The process of claim 1 wherein the hydrogenation and deoxygenation conditions include a temperature of about 200° C. to about 300° C. and a pressure of about 1379 kPa absolute (200 psia) to about 4826 kPa absolute (700 psia); the isomerization conditions include a temperature of about 150° C. to about 360° C. and a pressure of about 1724 kPa absolute (250 psia) to about 4726 kPa absolute (700 psia); the selective cracking conditions include an inlet temperature of the catalyst bed in the range of from about 232° C. to about 454° C., and the inlet pressure in the range of about 1379 kPa gauge (200 psig) to about 13,790 kPa gauge (2,000 psig); the partial deoxygenation zone is operated at a pressure in the range from 3.4 MPa (500 psia) to about 20.6 MPa (3000 psia) and a temperature in the range of about 200° C. to about 400° C.; and the full deoxygenation zone is operated at a pressure between about 689 kPa (100 psia) to about 13.8 MPa (2000 psia) and at a temperature of about 300° C. to about 500° C.

8. The process of claim 1 wherein at least one of the renewable feedstocks is in a mixture or co-feed with a petroleum hydrocarbon feedstock, and the petroleum hydrocarbon feedstock is co-processed with the renewable feedstock.

9. An aviation boiling point range blended fuel and a gasoline boiling point range blended fuel as produced by the process of claim 1.

10. The process of claim 1 further comprising mixing one or more additives to at least one of the aviation boiling point range blended fuel and the gasoline boiling point range blended fuel.

11. The process of claim 1 wherein the selective cracking is performed before, after, or concurrent with the isomerization.

12. The process of claim 1 wherein the isomerization catalyst and the selective cracking catalyst are the same and the isomerization and selective cracking occur concurrently in the same reaction zone.

13. The process of claim 1 wherein the paraffin rich component comprises at least 30 mole-% of hydrocarbons having from about 9 to about 15 carbon atoms.

14. The process of claim 1 wherein the dehydrogenating and deoxygenating further generates at least propane which is separated from the n-paraffins and conducted to a steam reforming zone to produce at least hydrogen, and said hydrogen being recycled to at least the dehydrogenating and deoxygenating step.

15. The process of claim 1 wherein the selective cracking further provides hydrocarbons having 8 or less carbon atoms which are separated from hydrocarbons having 9 or more carbon atoms, the hydrocarbons having 8 or less carbon atoms being conducted to a steam reforming zone to produce at least hydrogen, said hydrogen being recycled to at least the dehydrogenating and deoxygenating step.

16. A blended fuel meeting the specification of MTL-DTL-83133 wherein at least one component of the blended fuel is the aviation boiling point range blended fuel produced by the process of claim 1.

17. A blended fuel comprising the gasoline boiling point range blended fuel of claim 1 and a component produced from processing a petroleum feedstock.

18. A blended fuel comprising the aviation boiling point range blended fuel of claim 1 and a component produced from processing a petroleum feedstock.

19. A process for producing a blended fuel from renewable feedstocks comprising;
  a) generating at least one paraffin rich component from a first renewable feedstock comprising glycerides and free fatty acids, the steps comprising:
    i) hydrogenating and deoxygenating the first renewable feedstock by contacting the first renewable feedstock with a hydrogenation and deoxygenation catalyst in the presence of hydrogen and at hydrogenation and deoxygenation conditions to provide n-paraffins;
    ii) isomerizing at least a portion of the n-paraffins by contacting with an isomerization catalyst at isomerization conditions to generate branched-paraffins;
    iii) selectively cracking the n-paraffins, the branched-paraffins, or a mixture thereof by contacting with a selective cracking catalyst at selective cracking conditions to generate the paraffin rich component;
  b) generating a cyclic rich component from a second renewable feedstock comprising pyrolysis oil, the steps comprising:
    i) deoxygenating the pyrolysis oil in a deoxygenation zone by contacting, in the presence of hydrogen at deoxygenation conditions, the pyrolysis oil with a first deoxygenation and hydrogenation catalyst in a first portion of the deoxygenation zone with a second deoxygenation catalyst in a second portion of the deoxygenation zone to produce a deoxygenated pyrolysis oil stream comprising water, gasses, light ends, and cyclic hydrocarbons;
    ii) passing the deoxygenated pyrolysis oil stream to a separation zone to separate a water, gasses, and light ends stream from a cyclic rich component comprising cyclic compounds useful as a fuel or a fuel blending component in the boiling point ranges of gasoline, aviation, diesel, and any combination thereof;
  c) blending at least a portion of the paraffin rich component and at least a portion of the cyclic rich component to form at least one blended fuel selected from the group consisting of a gasoline boiling point range blended fuel, an aviation boiling point range blended fuel, or any combination thereof.

20. A process for producing a blended fuel from renewable feedstocks comprising;
  a) generating at least one paraffin rich component from a first renewable feedstock comprising glycerides and free fatty acids, the steps comprising:
    i) hydrogenating and deoxygenating the first renewable feedstock by contacting the first renewable feedstock with a hydrogenation and deoxygenation catalyst in the presence of hydrogen and at hydrogenation and deoxygenation conditions to provide n-paraffins;
    ii) isomerizing at least a portion of the n-paraffins by contacting with an isomerization catalyst at isomerization conditions to generate branched-paraffins;
    iii) selectively cracking the n-paraffins, the branched-paraffins, or a mixture thereof by contacting with a selective cracking catalyst at selective cracking conditions to generate the paraffin rich component;
  b) generating a cyclic rich component from a second renewable feedstock comprising pyrolysis oil, the steps comprising:
    i) deoxygenating the pyrolysis oil in a deoxygenation zone by contacting, in the presence of hydrogen at deoxygenation conditions, the pyrolysis oil with a mixture of a first deoxygenation catalyst and a second deoxygenation catalyst to produce a deoxygenated pyrolysis oil stream comprising water, gasses, light ends, and cyclic hydrocarbons wherein the first deoxygenation catalyst is a hydrotreating catalyst and the second deoxygenation catalyst is a hydrocracking catalyst;
    ii) passing the deoxygenated pyrolysis oil stream to a separation zone to separate a water, gasses, and light ends stream from a cyclic rich component comprising cyclic compounds useful as a fuel or a fuel blending component in the boiling point ranges of gasoline, aviation, diesel, and any combination thereof; and
  c) blending at least a portion of the paraffin rich component and at least a portion of the cyclic rich component to form a blended fuel selected from the group consisting of a gasoline boiling point range blended fuel, an aviation boiling point range blended fuel, or any combination thereof.

21. The process of claim 1 further comprising pre-treating the first renewable feedstock, the second renewable feedstock, or both in one or more pretreatment zones at pretreatment conditions to remove at least a portion of contaminants in the feedstocks.

* * * * *